United States Patent
Lee et al.

(10) Patent No.: US 10,284,002 B2
(45) Date of Patent: May 7, 2019

(54) APPARATUS FOR RECEIVING WIRELESS POWER AND METHOD OF CONTROLLING SAME

(71) Applicant: Samsung Electronics Co., Ltd., Gyeonggi-do (KR)

(72) Inventors: Jung-Min Lee, Gyeonggi-do (KR); Young-Mi Ha, Gyeonggi-do (KR); Hong-Min Son, Gwangju (KR); Sung-Joon Cho, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 22 days.

(21) Appl. No.: 15/633,947

(22) Filed: Jun. 27, 2017

(65) Prior Publication Data
US 2018/0034305 A1 Feb. 1, 2018

(30) Foreign Application Priority Data

Jul. 29, 2016 (KR) .................. 10-2016-0096748

(51) Int. Cl.
| | |
|---|---|
| H02J 7/00 | (2006.01) |
| H02J 7/02 | (2016.01) |
| H02J 50/10 | (2016.01) |
| H02J 50/60 | (2016.01) |
| H02J 7/04 | (2006.01) |

(52) U.S. Cl.
CPC ............ *H02J 7/025* (2013.01); *H02J 7/0029* (2013.01); *H02J 7/045* (2013.01); *H02J 7/047* (2013.01); *H02J 50/10* (2016.02); *H02J 50/60* (2016.02); *H02J 2007/0039* (2013.01); *H02J 2007/0096* (2013.01)

(58) Field of Classification Search
CPC ....................................................... H02J 7/025
USPC ....................................................... 320/108
See application file for complete search history.

(56) References Cited

U.S. PATENT DOCUMENTS

| | | | |
|---|---|---|---|
| 5,214,370 A | * | 5/1993 | Harm .................. H02J 7/008 320/152 |
| 2011/0012558 A1 | | 1/2011 | Schaffnit |

(Continued)

FOREIGN PATENT DOCUMENTS

| | | |
|---|---|---|
| KR | 10-1213089 B1 | 1/2013 |
| KR | 10-2016-0030779 A | 3/2016 |

OTHER PUBLICATIONS

European Search Report dated Oct. 5, 2017.

*Primary Examiner* — Suresh Memula
(74) *Attorney, Agent, or Firm* — Cha-Reiter, LLC

(57) ABSTRACT

A reception device for receiving wireless power may include: a power reception circuit configured to wirelessly receive power from a transmission device, rectify the received power, and output the rectified power; a charger configured to process the rectified power received from the power reception circuit and charge a battery of the reception device or output the rectified power to a system of the reception device; and a control circuit configured to, when an event for changing an input current limit of the charger is detected, gradually change the input current limit of the charger by stepping up or stepping down the input current limit to one or more intermediary values until the input current limit reaches a predetermined value.

32 Claims, 22 Drawing Sheets

(56) References Cited

U.S. PATENT DOCUMENTS

| | | |
|---|---|---|
| 2011/0261601 A1* | 10/2011 | Chapman .......... H02M 3/33523 |
| | | 363/131 |
| 2014/0084856 A1 | 3/2014 | Howard et al. |
| 2014/0145504 A1 | 5/2014 | Kayama |
| 2015/0229155 A1 | 8/2015 | Sporck et al. |
| 2016/0064962 A1 | 3/2016 | Huang et al. |
| 2016/0079794 A1 | 3/2016 | Cho et al. |
| 2017/0222564 A1* | 8/2017 | Yamamoto ............. G01K 3/005 |

* cited by examiner

APPARATUS FOR RECEIVING WIRELESS POWER AND METHOD OF CONTROLLING SAME

CLAIM OF PRIORITY

This application claims priority under 35 U.S.C. § 119(a) to Korean Application Serial No. 10-2016-0096748, which was filed in the Korean Intellectual Property Office on Jul. 29, 2016, the entire content of which is hereby incorporated by reference.

TECHNICAL FIELD

The present disclosure generally relates to an apparatus for receiving wireless power and a method of controlling the same and, more particularly, to a wireless power reception apparatus for wirelessly receiving power from a wireless power transmission apparatus and a method of controlling the same.

BACKGROUND

Mobile terminals such as a mobile phone, a Personal Digital Assistant (PDA) and the like are generally powered by rechargeable batteries. The battery of the mobile terminal is charged using a separate charging device that supplies electric energy. Typically, the charging device and the battery have separate contact terminals that are physically connected, by for example a wire, during the charging operations.

However, in these types of charging schemes, the contact terminals are exposed and thus may be easily contaminated by foreign substances. As a result, battery charging may not be correctly performed. Further, the battery charging may also not be correctly performed when the contact terminal is exposed to moisture.

Recently, wireless charging or non-contact charging technologies have been developed and used for electronic devices to solve the above-mentioned problem.

Such wireless charging technology employs wireless electric power transmission/reception, and corresponds to, for example, a system in which a battery can be automatically charged when a portable phone is not physically connected to a separate charging apparatus by wire, but by merely placing the phone on a charging pad. This wireless charging technology can improve waterproof functionality of the electronic device because expose contact terminals may be removed from the devices. In the near further, wireless charging may be deployed not only in portable devices such as mobile phones and electric toothbrushes but also in, for example, electric cars.

Wireless charging technology may be based on electromagnetic induction using a coil, electric resonance, and/or RF/microwave radiation that converts electrical energy to a microwave and then transmitting the microwave.

SUMMARY

However, compared to the existing wired charging, power stability of wireless charging is typically more precarious. For example, during wireless charging, power transmission between a wireless power transmission device and a wireless power reception device may be disconnected or charging may be stopped due to errors.

In order to solve the above described problems or other problems, various embodiments disclosed herein provide a wireless power reception device and a method of controlling the same which can stably perform wireless charging by controlling an input current limit of an embedded charger.

In accordance with an aspect of the present disclosure, a reception device for receiving wireless power is provided. The reception device includes: a power reception circuit configured to wirelessly receive power from a transmission device, rectify the received power, and output the rectified power; a charger configured to process the rectified power received from the power reception circuit and charge a battery of the reception device or output the power to a system of the reception device; and a control circuit configured to, when an event for changing an input current limit of the charger is detected, gradually change the input current limit of the charger by stepping up or stepping down the input current limit to one or more intermediary values until the input current limit reaches a predetermined value.

In accordance with another aspect of the present disclosure, a method of controlling a reception device for receiving wireless power is provided. The method includes: wirelessly receiving power from a transmission device, and rectifying and outputting the received power; processing the rectified power to charge a battery of the reception device or outputting the power to a system of the reception device; and when an event for changing an input current limit of a charger is detected, gradually changing the input current limit of the charger by stepping up or stepping down the input current limit to one or more intermediary values until the input current limit reaches a predetermined value.

In accordance with another aspect of the present disclosure, a reception device for receiving wireless power is provided. The reception device includes: a power reception circuit configured to wirelessly receive power from a transmission device, and rectify and output the received power; a charger configured to process the rectified power received from the power reception circuit and charge a battery of the reception device or output the power to a system of the reception device; a temperature sensor; and a control circuit configured to, when a temperature sensed by the temperature sensor exceeds a preset threshold value, control to increase an output voltage of the power reception circuit to a preset value.

In accordance with another aspect of the present disclosure, a reception device for receiving wireless power is provided. The reception device includes: a power reception circuit configured to wirelessly receive power from a transmission device and comprising a rectifier to rectify the received power; a charger configured to process the rectified power received from the power reception circuit and charge a battery of the reception device or output the power to a system of the reception device; and a control circuit configured to set a headroom value between an output voltage of the rectifier and an output voltage of the power reception circuit as a first value for a first period during which the reception device is recognized by the transmission device and set the headroom value as a second value for a second period during which the reception device wirelessly receives the power from the transmission device.

In accordance with another aspect of the present disclosure, a reception device for receiving wireless power is provided. The reception device includes: a power reception circuit configured to wirelessly receive power from a transmission device and comprising a rectifier to rectify the received power; a communication module; a charger configured to process the rectified power received from the power reception circuit and charge a battery of the reception device or output the power to a system of the reception device; and a control circuit configured to, when switching of a charging mode of the charger from a Constant Current (CC) mode to a Constant Voltage (CV) mode is detected, control the communication module to transmit a request for resetting a foreign material detection setting value to the transmission device.

Various embodiments may provide a wireless power reception device and a method of controlling the same which can stably perform wireless charging by controlling an input current limit of an embedded charger.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
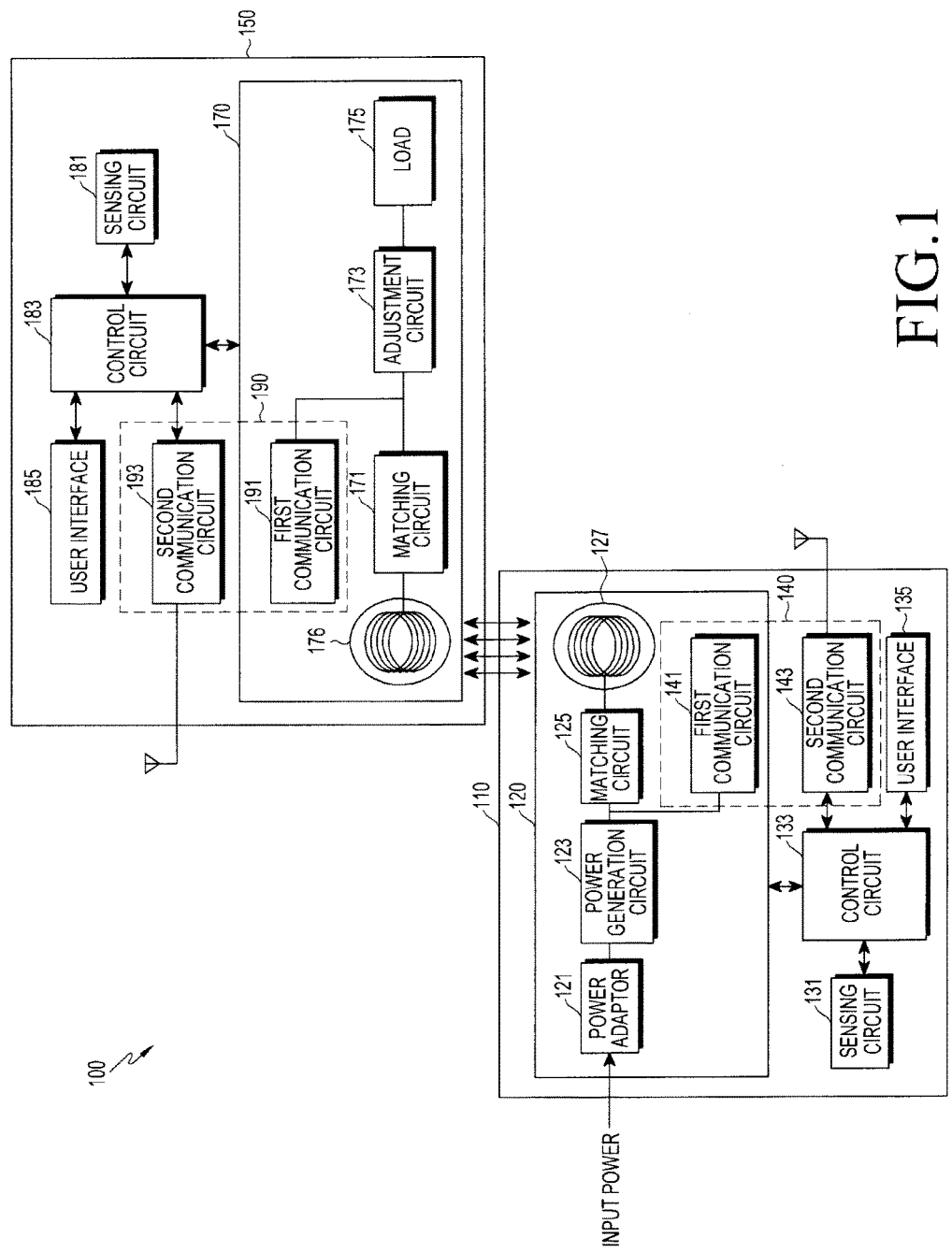
FIG. 1 illustrates a wireless charging system 100 according to one embodiment of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have," "may have," "include," or "may include" refers to the existence of a corresponding feature (e.g., numeral, function, operation, or constituent element such as component), and does not exclude one or more additional features.

In the present disclosure, the expression "A or B," "at least one of A or/and B," or "one or more of A or/and B" may include all possible combinations of the items listed. For example, the expression "A or B," "at least one of A and B," or "at least one of A or B" refers to all of (1) including at least one A, (2) including at least one B, or (3) including all of at least one A and at least one B.

The expression "a first," "a second," "the first," or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for," "having the capacity to," "designed to," "adapted to," "made to," or "capable of" according to the situation. The term "configured to" may not necessarily imply "specifically designed to" in hardware. Alternatively, in some situations, the expression "device configured to" may mean that the device, together with other devices or components, "is able to." For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In addition, the electronic device may wirelessly receive power from a wireless power transmitter and thus may be called wireless power receiver.

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or an electric car. In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

FIG. 1 illustrates a wireless charging system 100 according to one embodiment of the present disclosure. The wireless charging system 100 uses wireless power transmission and reception and corresponds to a system that can charge a battery without a connection of a separate wired charging connector to the reception device 150. The reception device 150 may be a mobile phone or components of a mobile phone. The wireless charging system may include a transmission device 110 and the reception device 150. For example, the transmission device 110 may include a power transmission circuit 120, a sensing circuit 131, a control circuit 133, a user interface 135, and/or a communication circuit 140. The reception device 150 may include, for example, a power reception circuit 170, a sensing circuit 181, a control circuit 183, a user interface 185, and/or a communication circuit 190. Although FIG. 1 illustrates that the transmission device 110 includes only the power transmission circuit 120 and the reception device 150 includes only the power reception circuit 170, each of the transmission device 110 and the reception device 150 may include both the power transmission circuit 120 and the power reception circuit 170. Accordingly, the transmission device 110 may perform a function of the reception device 150 or the reception device 150 may perform a function of the transmission device 110.

The wireless charging system 100 according to one embodiment may be based on at least one of inductive coupling scheme based on an electromagnetic induction phenomenon and resonance coupling scheme based on an electromagnetic resonance phenomenon of a particular frequency. In the inductive coupling scheme, the transmission device 110 may generate a magnetic field by applying a current to the power transmission circuit 120, and the reception device 150 may receive an induced electromotive force generated by the magnetic field in the power reception circuit 170. In the resonance coupling scheme, the transmission device 110 may generate an electromagnetic wave having a selected resonant frequency by using the power transmission circuit 120, and the reception device 150 may receive the generated electromagnetic wave by using the power reception circuit 170.

The power transmission circuit 120 may include a power adaptor 121, a power generation circuit 123, a matching circuit 125, a conductive pattern 127, and/or a first communication circuit 141.

The power adaptor 121 may receive an alternating (AC) or a direct current (DC) from an external device (for example, an external power source) or the battery included in the transmission device 110. If the received current is DC, the power adaptor 121 may output the direct current. An amount of the direct current output from the power adaptor 121 may be controlled by the control circuit 133. The direct current output from the power adaptor 121 may be transmitted to the power generation circuit 123.

The power generation circuit 123 may convert the direct current received from the power adaptor 121 into the alternating current and output the converted alternating current. The power generation circuit 123 may include a predetermined amplifier (not shown). When the direct current input through the power adaptor 121 is smaller than a preset gain, the amplifier may amplify the received direct current by the preset gain. The power generation circuit 123 may receive a control signal from the control circuit 133 and convert the received direct current into the alternating current based on the received control signal. For example, the power generation circuit 123 may convert the direct current into the alternating current by using an inverter. In another example, the power generation circuit 123 may include, for example, a gate driving circuit (not shown). For example, the gate driving circuit may selectively pass the received direct current, so as to convert the received direct current into the alternating current. The power generation circuit 123 may also generate the alternating current power through, for example, a power generator (for example, an oscillator).

The matching circuit 125 may perform impedance matching on the conductive pattern 127. For example, when the alternating current output from the power generation circuit 123 is transferred to the conductive pattern 127, an electromagnetic wave may be generated from the conductive pattern 127. The matching circuit 125 may control efficiency of output power generated through the conductive pattern 127 and transmitted to the reception device 150 by controlling an internal impedance value of the matching circuit 125. For example, the matching circuit 125 may include at least one of an inductor (for example, coil), a capacitor, and a switching device. For example, the control circuit 133 may control the internal impedance value of the matching circuit 125 by controlling a connection state between the inductor and/or the capacitor through the switching device of the matching circuit 125.

When the wireless charging system 100 employs the inductive coupling scheme, the conductive pattern 127 may generate a magnetic field to induce the current to the reception device 150 based on the current applied to the conductive pattern 127. When the wireless charging system 100 employs the resonance coupling scheme, the conductive pattern 127 may include a coil and/or a capacitor for converting the input alternating current power into the electromagnetic wave having the resonant frequency. The conductive pattern 127 of the transmission device 110 may be configured to output electromagnetic waves of substantially the same resonant frequency as, for example, those to be received by the conductive pattern 176 of the reception device 150. For example, the resonant frequency may range from 87 kHz to 205 kHz, from 277 kHz to 357 kHz, 3.28 MHz, or 6.78 MHz.

Power transmission efficiency between the transmission device 110 and the reception device 150 within the wireless charging system 100 according to one embodiment may be influenced by an alignment and/or a distance between the transmission device 110 and the reception device 150.

For example, the transmission device 110 may generate a magnetic field for inducing the current to the reception device 150 by selectively using some of a plurality of transmission coils included in the conductive pattern 127. For example, the transmission device 110 may generate the magnetic field by using some coils aligned with the reception coils of the reception device 150 among the plurality of coils. For example, the transmission device 110 may include a multiplexer configured to establish or release a connection between some coils of the plurality of coils. For example, the multiplexer may select some coils aligned with the reception coils among the plurality of coils based on a determination of locations of the reception device 150 and/or the reception coils.

As another example, the conductive pattern 127 of the transmission device and the conductive pattern 176 of the reception device may include physically movable coils. For example, the transmission device 110 may physically move the conductive pattern 127 such that a distance between the center of the conductive pattern 127 of the transmission device and the center of the conductive pattern 176 of the reception device is within a predetermined range, thereby enabling power transmission.

Each of the transmission device 110 and the reception device 150 may include a magnetic material. When the transmission device 110 and the reception device 150 are adjacent to each other, the magnetic force generated by the magnetic material may cause the conductive pattern 127 of the transmission device and the conductive pattern 176 of the reception device to be properly aligned. For example, the magnetic material may be disposed inside the conductive pattern 127 of the transmission device or inside the conductive pattern 176 of the reception device, or may be disposed outside the conductive pattern 127 of the transmission device or outside the conductive pattern 176 of the reception device while being adjacent to the conductive pattern 127 of the transmission device or the conductive pattern 176 of the reception device.

The sensing circuit 131 may sense at least one of a temperature change of the transmission device 110, ambient illumination, and an ambient sound. For example, the control circuit 133 may control an amount of power to be transmitted to the reception device 150 based on the temperature change, the ambient illumination, or the ambient sound of the transmission device 110 sensed by the sensing circuit 131. For example, the sensing circuit 131 may include at least one of a temperature sensor, an illumination sensor, and a sound sensor.

The control circuit 133 may control the operations of the transmission device 110 to wirelessly transmit power to the reception device 150. For example, the control circuit 133 may determine the amount of power to be transmitted to the reception device 150 based on monitoring of a change in the current or voltage within the power transmission circuit 120. The control circuit 133 may transmit and receive information to and from the reception device 150 through, for example, the communication circuit 140. For example, the control circuit 133 may determine an operation state of the reception device 150 based on the information received from the reception device 150. For example, the control circuit 133 may determine or change the amount of power to be transmitted to the reception device 150 based on the determined operation state of the reception device 150. The control circuit 133 may output the state of the reception device 150 through the user interface 135 based on, for example, the information received from the reception device 150. For example, the control circuit 133 may display the state of the reception device 150 on a display (not shown).

For example, the information received from the reception device 150 may include at least one piece of state information related to a load 175 (for example, the load of a battery or a battery) of the reception device 150, power amount control information related to control of the amount of power transmitted to the reception device 150, environment information related to wireless charging of the reception device 150, and/or time information, etc. For example, the state information related to the load 175 may include at least one of a total capacity of the battery of the reception device 150, an amount of use, a residual amount, the number of times of charging, a voltage, a current, a charging mode, a charging type, and/or a wireless reception frequency band. The power amount control information may include, for example, information for controlling an amount of power to be transmitted from the transmission device 110 based on a change of an amount of power charged in the load 175 during wireless charging. The environment information may include, for example, at least one piece of internal temperature information or ambient temperature information of the reception device 150, ambient illumination (brightness) information of the reception device 150, and ambient sound (noise) information of the reception device 150.

The user interface 135 may provide an output related to the state information or the ambient environment information of the transmission device 110. For example, the user interface 135 may provide an output configured to guide the user to a location where the transmission device 110 is located. For example, the user interface 135 may guide the user to the location of the transmission device 110, by outputting at least one of an image, a text message, a vibration, a voice message, and/or a sound effect. For example, the user interface 135 may include at least one of a display, a vibration device, a speaker, and/or a light emitting diode.

The communication circuit 140 may transmit and receive a signal related to wireless charging to and from the reception device 150. For example, the communication circuit 140 may unicast, multicast, or broadcast information related to wireless charging. The communication circuit 140 may include at least one of the first communication circuit 141 and a second communication circuit 143. Although FIG. 1 separately illustrates the first communication circuit 141 and the second communication circuit 143, the first communication circuit 141 and the second communication circuit 143 may be implemented as one integrated circuit or one of them may be omitted. For example, the first communication circuit 141 may be implemented in at least a part of the power transmission circuit 120 and may communicate with an external device in-band. The second communication circuit 143 may be separated from, for example, the power transmission circuit 120 and may communicate with an external device out-of-band.

For example, the first communication circuit 141 may transmit and receive a signal to and from the reception device 150 through the conductive pattern 127 in-band. In-band refers to when a signal is transmitted and received between the transmission device 110 and the reception device 150 using a frequency band used for wireless power transmission. For example, the first communication circuit 141 may transmit a modulated signal to the reception device 150 through the frequency band used for wireless power transmission. The first communication circuit 141 may extract, for example, information from the signal by decoding a signal received from the reception device 150.

For example, the second communication circuit 143 may transmit and receive a signal to and from the reception device 150 out-of-band. Out-of-band refers to when information required for power transmission is transmitted and received between the transmission device 110 and the reception device 150 using a separate frequency band other than the frequency band used for wireless power transmission. The second communication circuit 143 may transmit and receive a signal to and from the communication circuit 190 (for example, a second communication circuit 193) of the reception device 150 through at least one of Near Field Communication (NFC), ZigBee communication, infrared communication, visible ray communication, Bluetooth communication, and Bluetooth Low Energy (BLE) communication.

The power reception circuit 170 may include a matching circuit 171, a rectification circuit 172, an adjustment circuit 173, the load 175, or the conductive pattern 176.

The power reception circuit 170 may wirelessly receive power in an electromagnetic wave generated from the conductive pattern 127 of the power transmission circuit 120 through the conductive pattern 176. For example, the power reception circuit 170 may receive power based on an induced electromotive force formed in the conductive pattern 176 of the power reception circuit 170 by the electromagnetic wave generated from the conductive pattern 127 of the power transmission circuit 120.

The matching circuit 171 may perform impedance matching. For example, the electromagnetic wave generated from the conductive pattern 127 of the transmission device 110 may be transferred to the conductive pattern 176. The matching circuit 171 may adjust a frequency band used for reception of the electromagnetic wave by controlling the impedance of the conductive pattern 176. The matching circuit 171 may include at least one of an inductor (for example, coil), a capacitor, and a switch. For example, the control circuit 183 may control a connection state between the inductor and/or the capacitor through the switch.

The adjustment circuit 173 may output a selected voltage regardless of an input voltage. For example, the adjustment circuit 173 may change a voltage of the conductive pattern 176 into a voltage (for example, 5 V) corresponding to the battery charging operation and output the changed voltage. For example, the adjustment circuit 173 may set a minimum value or a maximum value of the voltage to be changed. The adjustment circuit 173 may include, for example, a DC/DC converter or a Low Drop Out (LDO) (not shown). The adjustment circuit 173 may include, for example, a diode (for example, a bridge diode) and rectify the current received from the conductive pattern 176 through the diode.

The load 175 may receive power from the adjustment circuit 173. For example, when the load 175 is the battery, the battery may be charged by the supplied power.

The sensing circuit 181 may sense at least one of a temperature change of the reception device 150, ambient illumination, and an ambient sound. For example, the sensing circuit 131 may include at least one of a temperature sensor, an illumination sensor, and a sound sensor.

The control circuit 183 may calculate an amount of required power based on battery state information of the reception device 150. For example, when the transmission device 110 which can transmit wireless power is identified, the control circuit 183 may calculate an amount of required power based on at least one of a total capacity of the battery of the reception device 150, a residual amount of the battery, the number of times of charging, an amount of use of the battery, a charging mode, a charging type, and/or a wireless reception frequency band. For example, the control circuit 183 may transmit information related to the calculated amount of power to the transmission device 110 through the communication circuit 190. The control circuit 183 may transmit, for example, charging environment information of the reception device 150 to the transmission device 110. For example, when a temperature data value measured by the sensing circuit 181 is larger than or equal to a preset temperature reference value, the control circuit 183 may transmit the measured temperature data to the transmission device 110. The control circuit 183 may regularly or irregularly monitor, for example, a current or a voltage induced in the conductive pattern 176. For example, the control circuit 183 may determine an amount of power for which a request is made to the transmission device 110 based on the calculated amount of power and the monitored current or voltage.

The user interface 185 may output information related to a charging state of the reception device 150. For example, when the user interface 185 includes a display, the user interface 185 may display at least one of a total capacity of the battery of the reception device 150, a residual amount of the battery, a charged amount of the battery, an amount of use of the battery, and an expected charging time until full charge of the battery.

The communication circuit 190 may transmit and receive information related to wireless charging to and from the transmission device 110. The communication circuit 190 may operate to be the same as or similar to the communication circuit 140 of the transmission device 110.

Figure 2:
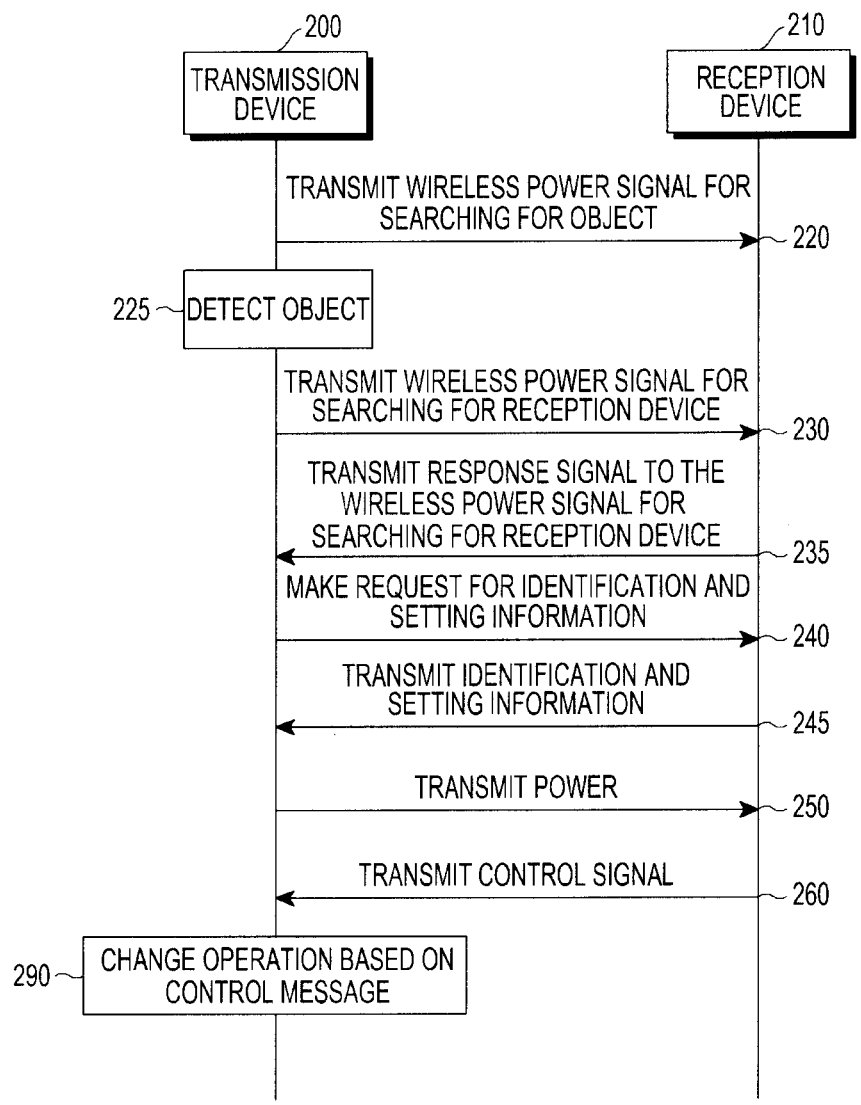
FIG. 2 illustrates operations of a transmission device (for example, a transmission device 110) and operations of a reception device (for example, a reception device 150) included in a wireless charging system (for example, the wireless charging system 100) according to one embodiment of the present disclosure.

FIG. 2 illustrates operations of a transmission device (for example, the transmission device 110) and operations of a reception device (for example, the reception device 150) included in a wireless charging system (for example, the wireless charging system 100) accordingly to one embodiment of the present disclosure. At least some of operations 220 to 270 may be omitted. For example, when unidirectional communication is performed in the wireless charging system 100, operation 240 may be omitted. A transmission device 200 may include at least some of the components (for example, the power transmission circuit 120, the sensing circuit 131, the control circuit 133, the user interface 135, and the communication circuit 140) included in the transmission device 110 of FIG. 1. The reception device 210 may include at least some of the components (for example, the power reception circuit 170, the sensing circuit 181, the control circuit 183, the user interface 185, and the communication circuit 190) included in the reception device 150 of FIG. 1.

In operation 220, the transmission device 200 may determine whether there is an object (for example, the reception device 210, a key, or a coin) within a detection area. The detection area may be an area in which the object can influence wireless transmission of the transmission device 200. For example, the detection area may be an interface surface of the transmission device in the inductive coupling scheme, and may be an area within a range in which power can be transmitted in the resonance coupling scheme. For example, the transmission device 200 may identify whether there is an object within a predetermined range by detecting a change of the power generated in the power transmission circuit 120. For example, the transmission device 200 may identify the object by detecting a change of at least one of a frequency, a current, and a voltage of the power transmission circuit 120. The transmission device 110 may distinguish between the reception device 210 and, for example, objects (for example, a key or a coin) which cannot receive wireless power when the objects are within the detection area.

For example, when power is transmitted through the inductive coupling scheme, the transmission device 200 may detect a location of the reception device 210 on the interface surface. For example, the transmission device 110 may apply the current to the power transmission circuit 120 and measure impedance of the conductive pattern 127 through the sensing circuit 131, so as to detect the location of the reception device 210. When a predetermined time passes or when the detection for the reception device 210 fails while a predetermined number of searches are done, the transmission device 200 may not perform operation 230 before the object on the interface surface is removed.

In operation 230, according to an embodiment, the transmission device 200 may transmit a wireless power signal for searching for the reception device 210 to the reception device 210. For example, the wireless power signal may include power for activating the reception device 210 or at least one component included in the reception device 210. The wireless power signal may be, for example, a signal generated at a selected operating point for a selected time. The operating point may be defined by a frequency, a duty cycle, or an amplitude of the voltage generated by the power transmission circuit 120.

In operation 235, the reception device 210 may transmit a response signal to the search signal of operation 230 to the transmission device 200. For example, the reception device 210 may transmit another power signal or a signal indicating that the search signal has been received to the transmission device 200. The another power signal may indicate a degree of inductive coupling or a degree of resonance coupling for power transmission between the transmission device 200 and the reception device 210. For example, when power received by the reception device 210 is lower compared to power transmitted by the transmission device 200, the reception device 210 may determine that the coupling degree is low. In another example, when there is no response to the power signal transmitted, the transmission device 200 may determine that the reception device 210 has not been found. For example, when the reception device 210 to which the transmission device 200 can transmit power has not been found, the transmission device 200 may repeatedly perform operation 220.

In operation 240, the transmission device 200 may request for identification information of the reception device 210 and/or setting information related to wireless charging. For example, the identification information may include version information, a manufacture code, or a basic device identifier. The setting information may include, for example, a wireless charging frequency, maximum charging power, a required power amount, or an average transmission power amount.

In operation 245, the reception device 210 may transmit identification information and/or setting information to the transmission device 200. The transmission device 200 may generate a power transfer contract used for power charging with the reception device 210 based on at least a part of the received identification information and/or setting information.

For example, the power transfer contract may include limits of parameters for power transmission between the transmission device 200 and reception device 210. The limits may include version information of the power transfer contract, identification information of the reception device 210, manufacturer information for the transmission device 200 and/or reception device 210, power class, expected maximum power information, option settings, etc.

In operation 250, the transmission device 200 may transmit power to the reception device 210. For example, the transmission device 200 may transmit power to the reception device 210 based on the power transfer contract. For example, when power transmission with the reception device 210 violates the limits included within the power transfer contract based on a result of monitoring of the parameters within the power transfer contract, the transmission device 200 may cancel the power transmission and return to perform operation 220 again. The transmission device 200 may transmit, for example, a signal having a resonant frequency from 87 kHz to 205 kHz, 277 kHz to 357 kHz, or 6.78 MHz to the reception device 210 as the power.

In operation 260, the reception device 210 may transmit a control signal to the transmission device 200 while receiving power from the transmission device 200. For example, when the battery is fully charged, the reception device 210 may transmit a control signal that requests for stopping wireless power transmission to the transmission device 200. The control signal may include, for example, at least one of a control error signal, a received power signal, a charge status signal, and an end power transfer signal.

For example, the control error signal may include a header informing of a control error and a message including a control error value. For example, when the power received from the transmission device 200 in operation 250 is within a selected range, the reception device 210 may set the control error value as 0. But when the received power exceeds the selected range, the reception device 210 may set the control error value as a negative value. And when the received power is lower than the selected range, the reception device 210 may set the control error value as a positive value. The end power transfer signal may include, for example, a power transmission stop code indicating a reason of the stoppage. For example, the power transmission stop code may be configured to indicate one of charge complete, internal fault, temperature over a preset, voltage over a preset, current cover a preset, battery failure, reconfigure, no response, and unknown error.

In operation 290, the transmission device 200 may control the amount of transmitted power from the power transmission circuit 120 based on the received control message (for example, control error value). The transmission device 200 may end the power transmission to the reception device 210 based on, for example, the received control message. In this case, the transmission device 200 may return to perform operation 220 again.

Generally, wireless charging has lower stability compared to wired charging. For example, when current consumption in the reception device abruptly changes, wireless charging may be disconnected. For example, the disconnection of the wireless charging may occur when the reception device wakes from sleep, when an internal voltage of the reception device changes, or in an unstable environment such as a high temperature state. Further, the disconnection of the wireless charging may also occur by a Foreign Object Detection (FOD) error or packet misrecognition due to communication noise. Accordingly, one or more embodiments of the present disclosure provides improved stability for wireless charging.

Figure 3A:
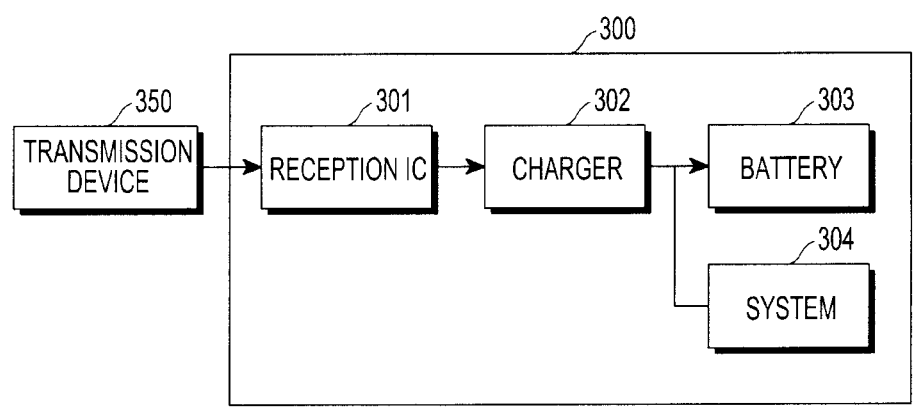
FIG. 3A is a block diagram of the reception device according to one embodiment of the present disclosure.

FIG. 3A is a block diagram of a reception device according to one embodiment of the present disclosure.

Referring to FIG. 3A, a reception device 300 may include a reception Integrated Chip (IC) 301, a charger 302, a battery 303, and a system 304.

The reception IC 301 may wirelessly receive power from a transmission device 350, rectify the power, and output the rectified power to the charger 302. The reception IC 301 may include reception circuit for receiving alternating current power from the transmission device 350. For example, the reception circuit may be a resonant circuit. The reception IC 301 may include a reception circuit that complies with a preset power supply scheme, for example, as defined in a WPC scheme or an A4WP scheme. The reception IC 301 may include various types of rectifiers, such a full-bridge diode and the like. The reception IC 301 may rectify the alternating current power received by the reception circuit to direct current power and output the direct current power. For example, the reception IC 301 may include a converter for converting a voltage of the direct current power output from the rectifier into a particular voltage. Accordingly, the reception IC 301 may receive the alternating current power from the transmission device 350, and rectify and convert the received alternating current power to output the direct current power having the particular voltage. The reception IC 301 may be implemented as a circuit in another form other than the IC form and, accordingly, may be named a power reception circuit. The reception IC 301 may be manufactured by a manufacturer according to the definition in the standard and may have difficulty in controlling the actual current and voltage.

The charger 302 may process the direct current power output from the reception IC 301 and output the processed direct current power. The charger 302 may be implemented as a Power Management Integrated Chip (PMIC) according to an implementation. When the battery 303 is charged, the charger 302 may control the voltage and/or the current of the current input to be suitable for charging the battery 303. For example, when the battery 303 is charged in a Constant Current (CC) mode, the charger 302 may control to maintain the current of output power as a preset value and adjust the voltage according to the current. Alternatively, when the battery 303 is charged in a Constant Voltage (CV) mode, the charger 302 may control to maintain the voltage of output power as a preset value and adjust the current according to the voltage. Further, when the system 304 requires power, the charger 302 may adjust at least one of the voltage and the current to a level suitable for the corresponding operation and provide at least one of the adjusted voltage and current. For example, when power is provided to a communication module in the system 304, the charger 302 may adjust power to the current and the voltage suitable for the communication module and provide the adjusted power. The charger 302 may also receive power from the battery 303 and transfer the power to the system 304.

Meanwhile, an input current limit of the charger 302 may be adjusted. A control circuit (not shown) of the reception device 300 may adjust the input current limit and, accordingly, a maximum value of the current input into the charger 302 from the reception IC 301 may be adjusted. The charger 302 may receive an input current only up the input current limit and, even though the reception IC 301 outputs a current that exceeds the input current limit of the charger 302. The control circuit (not shown) may include one or more of a Central Processing Unit (CPU), an Application Processor (AP), and a Communication Processor (CP). The control circuit (not shown) may carry out, for example, operations or data processing relating to the control and/or communication of at least one other element of the reception device 300. The control circuit (not shown) may be implemented as a Micro Control Unit (MCU) or a mini computer. The control circuit may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The reception IC 301 may transfer information related to wireless charging to the control circuit (not shown) of the system 304. Further, the charger 302 may also transfer the charging-related information to the control circuit (not shown) of the system 304. The control circuit (not shown) may transfer an instruction to each of the reception IC 301 and the charger 302 and set a current and a voltage. For example, the control circuit (not shown) may transfer an instruction for charging an output voltage (Vout) of the reception IC 301. For example, the control circuit (not shown) may also transfer an instruction for adjusting the input current limit of the charger 302 or an instruction for adjusting an output current setting value.

Figure 3B:
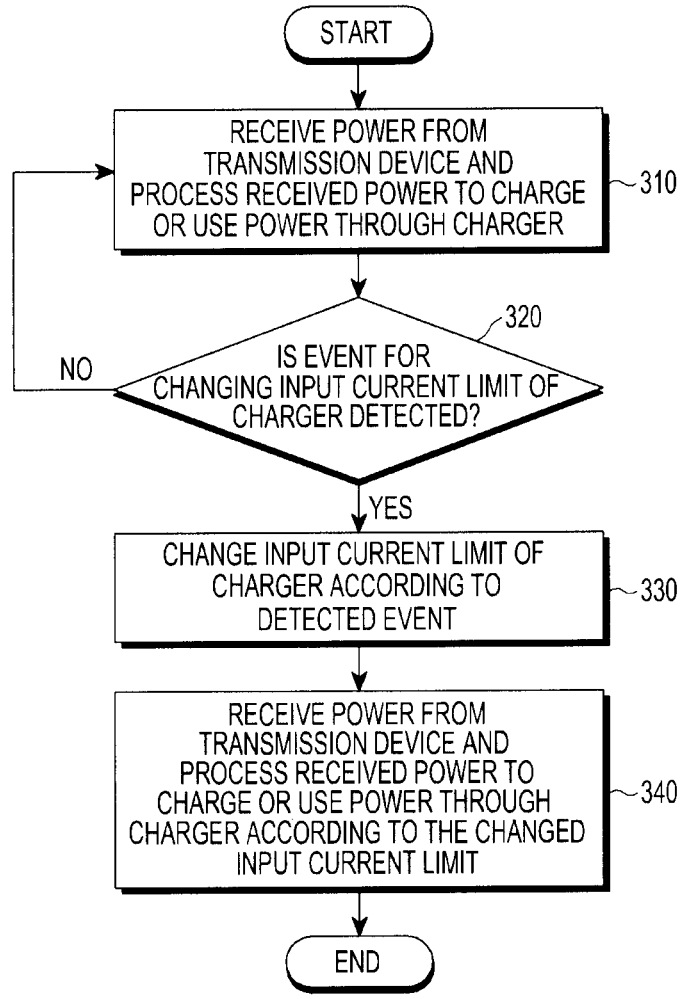
FIG. 3B is a flowchart illustrating a method of controlling the reception device according to one embodiment of the present disclosure.

FIG. 3B is a flowchart illustrating a method of controlling the reception device according to one embodiment of the present disclosure.

In operation 310, the reception device 300 may receive power from the transmission device 350 and process the received power to charge or use the power through the charger 302. For example, referring to FIG. 3A, the reception IC 301 may receive power, and the charger 302 may process power output from the reception IC 301 and output the power to the battery 303, so as to charge the battery 303. Alternatively, the charger 302 may process power output from the reception IC 301 and output the power to the system 304 to wirelessly use the received power.

In operation 320, the reception device 300 may determine whether an event for changing the input current limit of the charger 302 is detected. The event for changing the input current limit of the charger 302 may be defined as an event that causes a wireless charging disconnection. For example, when the current input into the charger 302 abruptly decreases or abruptly increases, wireless charging may be disconnected. Alternatively, when the current output from the charger 302 abruptly decreases or abruptly increases, wireless charging may be disconnected. Accordingly, a request to abruptly decrease or abruptly increase the current input into the charger 302 or a request to abruptly decrease or abruptly increase the current output from the charger 302 may be the event for changing the input current limit.

When the event for changing the input current limit is detected, the reception device 300, for example, the processor (for example, the Application Processor (AP), or the Control Processor (CP)) included in the system 304 may change the input current limit of the charger 302 according to the detected event in operation 330. For example, a charger control driver may be included in the system 304. Further, an Operating System (OS) executed in the reception device 300 may include a kernel. For example, the instruction for changing the input current limit of the charger 302 generated from at least one application may be transferred to the charger control driver through the kernel, and the input current limit of the charger 302 may be adjusted according to the instruction.

In operation 340, the reception device 300 may receive power from the transmission device 350 and process the received power through the charger 302 according to the changed input current limit to charge or use the power. According to an embodiment, the reception device 300 or a control circuit (not shown) may have enough time to gradually change the input current limit of the charger 302. Accordingly, the current input into the charger 302 may decrease or increase in a sufficiently long time period such that decreasing or increasing the input current is not abrupt, and thus the wireless charging may not be disconnected. The event for changing the input current limit may be variously set according to various causes of the wireless charging disconnection, which will be described below in more detail.

Figure 4A:
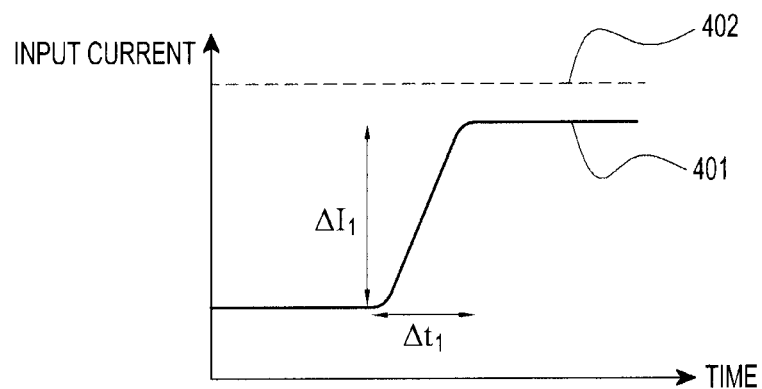
FIG. 4A and FIG. 4B are graphs illustrating a relation between an input current limit of a charger and a charger input current according to one embodiment of the present disclosure.
Figure 4B:
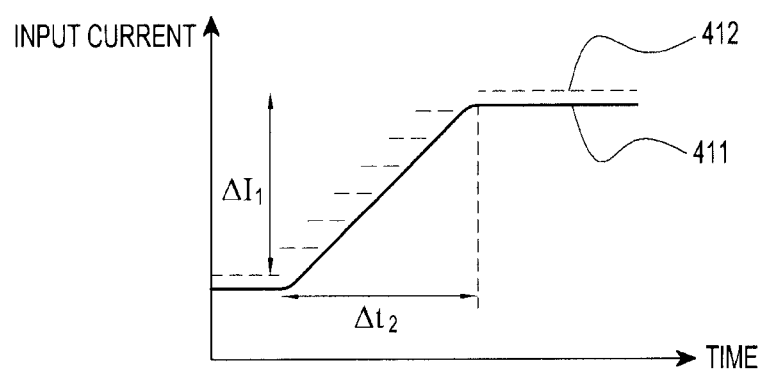

FIGS. 4A and 4B are graphs illustrating a relation between the input current limit of the charger and the charger input current according to one embodiment of the present disclosure.

FIG. 4A illustrates a case where an input current limit 402 of the charger remains at a predetermined value. When the input current limit 402 is constant, a current 401 input into the charger may be changed by a first value ($\Delta$I1) during a first period ($\Delta$t1). That is, since the size of the current after the input change is smaller than the input current limit 402, the input current 401 may be changed without restriction. In this case, change in the input current 401 may be abrupt.

Meanwhile, FIG. 4B illustrates a case where an input current limit 412 of the charger is gradually adjusted. As shown in FIG. 4B, the input current limit 412 may be gradually changed by stepping up the input current limit to one or more intermediary values in sequence until the input current limit reaches a predetermined value. Since the input current limit 412 of the charger is gradually changed, a current 411 input into the charger may not be changed during the first period ($\Delta$t1). Rather, the current 411 is changed during an extended second period ($\Delta$t2), as illustrated in FIG. 4B. That is, the current 411 may be changed for the period ($\Delta$t2) during which the input current limit 412 of the charger is changed and, accordingly, an abrupt increase in the current 411 may be prevented. As the abrupt increase of the current is prevented, wireless charging disconnection may also be prevented.

Figure 5:
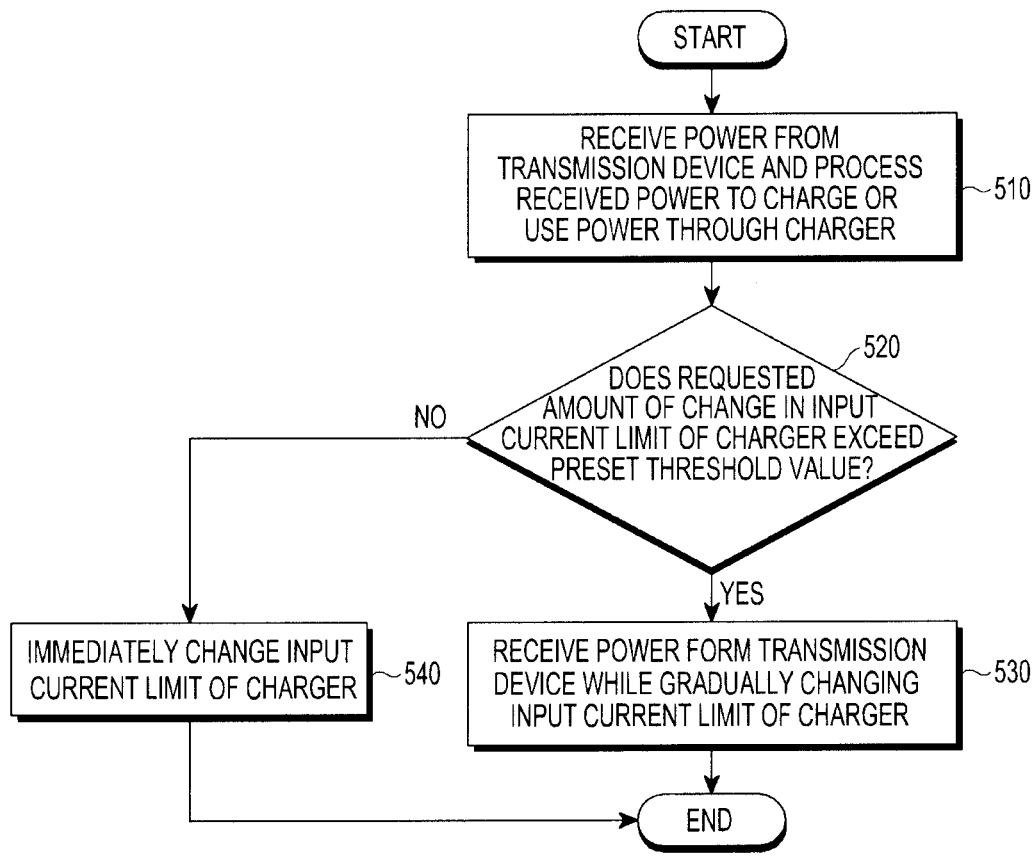
FIG. 5 is a flowchart illustrating a method of controlling the reception device according to one embodiment of the present disclosure.

FIG. 5 is a flowchart illustrating a method of controlling the reception device according to one embodiment of the present disclosure. The performance of a particular operation by the reception device may mean that the control circuit performs the particular operation or the control circuit controls another hardware to perform the particular operation. Alternatively, it may mean that another hardware performs the particular operation.

In operation 510, the reception device may receive power from the transmission device and process the received power to charge or use the power through the charger. In operation 520, the reception device may determine whether a request for changing the input current limit of the charger is larger than a preset threshold value.

Figure 6A:
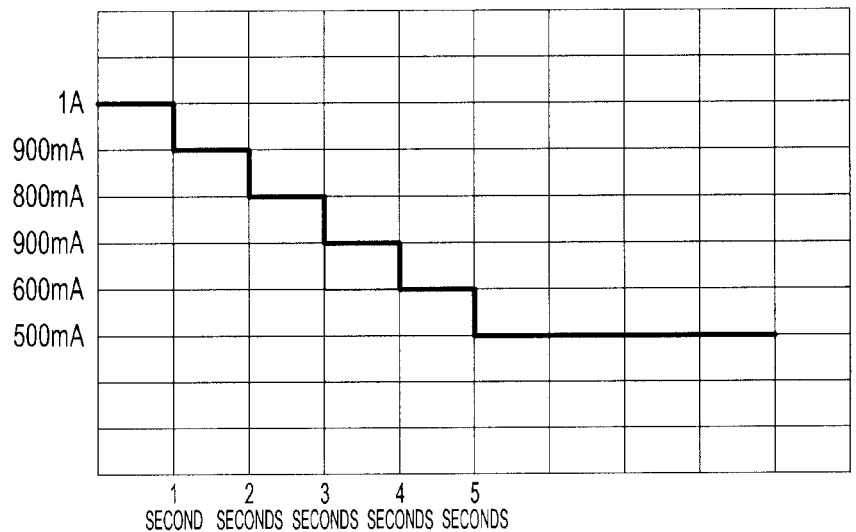
FIG. 6A and FIG. 6B are graphs illustrating a gradual adjustment of the input current limit of the charger according to one embodiment of the present disclosure.
Figure 6B:
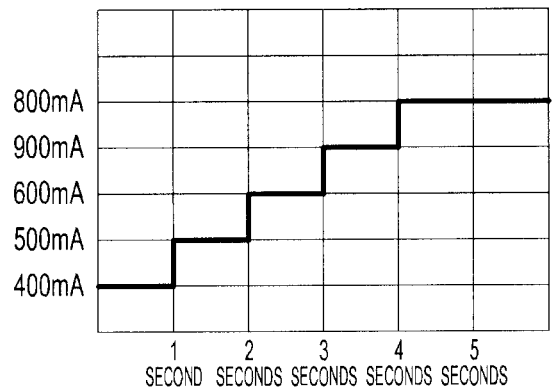

When it is determined that the request for changing the input current limit of the charger is larger than the preset threshold value, the reception device may receive power from the transmission device while gradually changing the input current limit of the charger in operation 530, as shown in FIG. 6A-6B. It is possible to prevent not only the input current of the charger of the reception device but also the current and the voltage at one or more points of the reception IC from being abruptly changed. According to another embodiment, the charger or the control circuit may directly receive a change of the input current limit of the charger. For example, when a type of the transmission device is changed or a current restriction is requested due to heat, the control circuit may directly change the input current limit of the charger.

When a requested amount of the change of the input current limit of the charger is equal to or smaller than the present threshold, the reception device may immediately, i.e. not gradually, change the input current limit of the charger in operation 540. That is, the reception device may change the input current limit of the charger at once rather than stepping the limit up or down to one or more intermediary values.

FIGS. 6A and 6B are graphs illustrating a gradual adjustment of the input current limit of the charger according to one embodiment of the present disclosure.

As illustrated in FIG. 6A, the input current limit of the charger may be changed from 1 A to 500 mA. For example, when the type of the transmission device is changed or the current restriction is requested due to heat, the control circuit may control the charger to change the input current limit thereof from 1 A to 500 mA. In this case, the control circuit may reduce the input current limit of the charger by 100 mA per second. Accordingly, the input current limit of the charger may decrease from 1 A to 500 mA over 5 seconds at intermediary values of 900 mA to 600 mA.

Further, as illustrated in FIG. 6B, the input current limit of the charger may be changed from 400 mA to 800 mA. For example, the reception device may receive power from a transmission device having a larger capacity than previous transmission device. The reception device may acquire identification information of the transmission device or information on a capacity of transmission power, and may increase the input current limit of the charger in accordance with the acquired information. In this case, the control circuit may increase the input current limit of the charger by 100 mA per second. Accordingly, the input current limit of the charger may increase from 400 mA to 800 mA over 4 seconds. As described above, as the input current limit of the charger is adjusted gradually for a relatively long time, abrupt change in current and/or voltage inside the reception IC can be prevented, and thus the wireless charging disconnection phenomenon can be improved.

Figure 7:
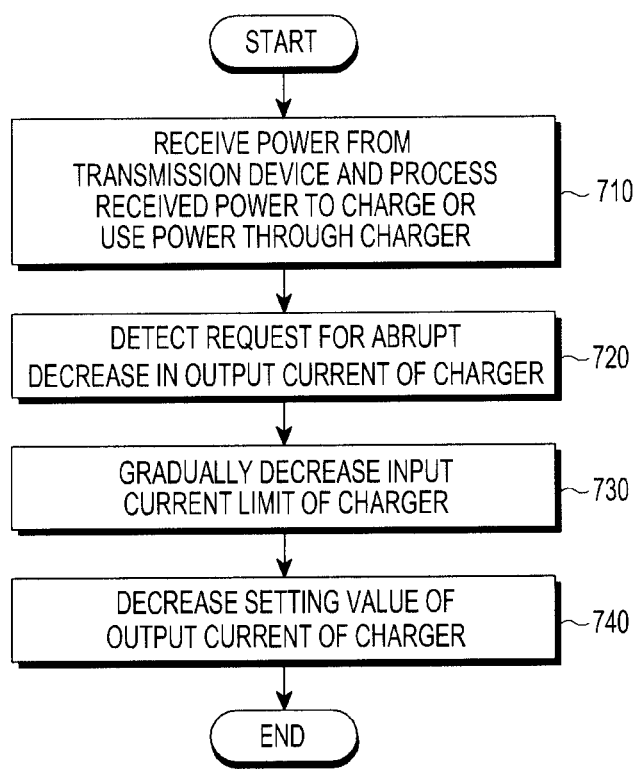
FIG. 7 is a flowchart illustrating a method of controlling the reception device according to one embodiment of the present disclosure.

FIG. 7 is a flowchart illustrating a method of controlling the reception device according to one embodiment of the present disclosure.

In operation 710, the reception device may receive power from the transmission device and process the received power to charge or use the power through the charger. In operation 720, the reception device may detect a request for an abrupt decrease in the output current of the charger. For example, the reception device may reduce the charging current as the battery charging becomes close to being full charged.

Figure 8:
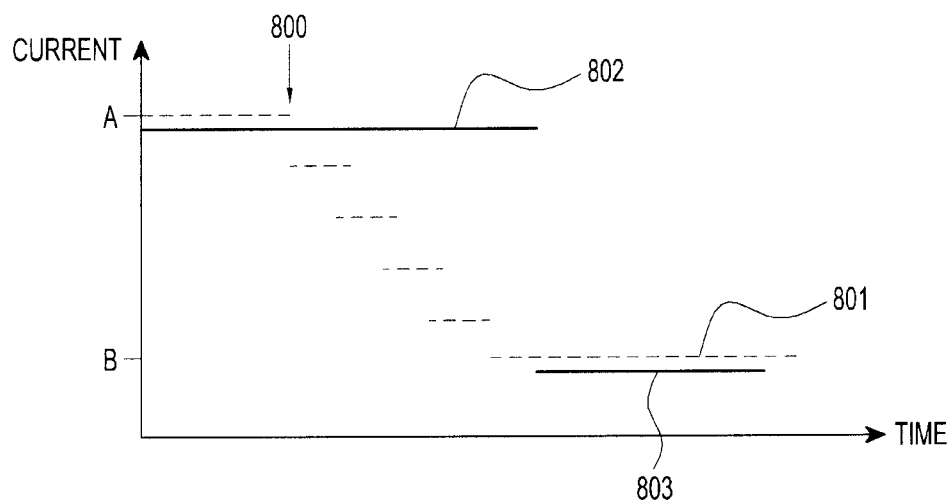
FIG. 8 is a graph illustrating a decrease in the input current limit and a decrease in a setting value of the charging current according to one embodiment of the present disclosure.

In operation 730, the reception device may first gradually reduce the input current limit of the charger. When the gradual decrease in the input current limit of the charger is completed, the reception device may reduce a setting value of the output current of the charger in operation 740. For example, the reception device may reduce the setting value of the charging current from 900 mA to 500 mA and also reduce the input current limit of the charger from 1 A to 600 mA. In this case, the reception device may reduce the input current limit of the charger from 1 A to 900 mA for a first period and, thereafter, may reduce the input current limit step by step by 100 mA such as from 900 mA to 800 mA. When the input current limit of the charger decreases to 600 mA, the reception device may reduce the charging current, that is, the setting value of the output current of the charger from 900 mA to 500 mA. As described above, by gradually reducing the input current limit, the size of the output current, for example, the charging current actually output regardless of the load of system current consumption can be adjusted step by step in the unit of 100 mA. FIG. 8 is a graph illustrating a decrease in the input current limit and a decrease in the setting value of the charging current. As illustrated in FIG. 8, the reception device according to one embodiment may gradually reduce the input current limit from a first value 800 to a second value 801 and, thereafter, reduce the setting value of the output current of the charger from a third value 802 to a fourth value 803.

Figure 9:
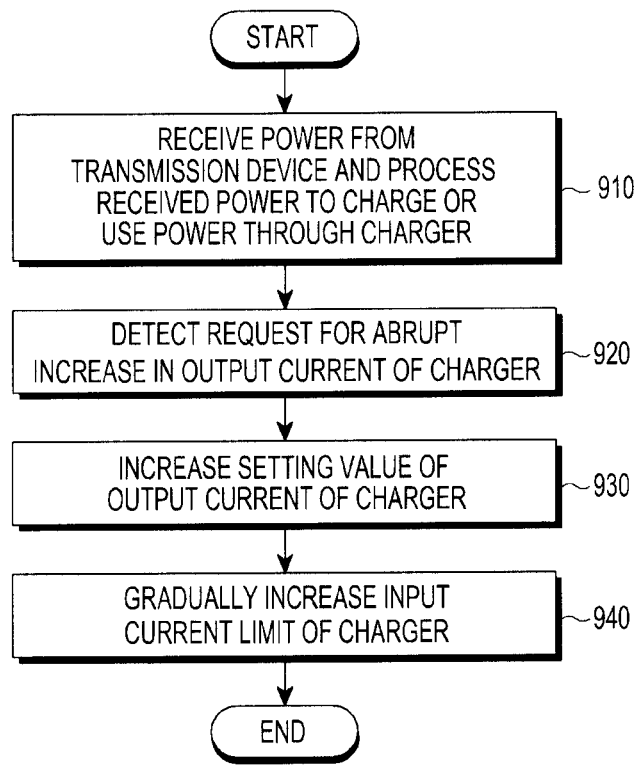
FIG. 9 is a flowchart illustrating a method of controlling the reception device according to one embodiment of the present disclosure.

FIG. 9 is a flowchart illustrating a method of controlling the reception device according to one embodiment of the present disclosure.

In operation 910, the reception device may receive power from the transmission device and process the received power to charge or use the power through the charger. In operation 920, the reception device may detect a request for an abrupt increase in the output current of the charger. For example, the reception device may receive a request for a quick charge operation of the battery and, accordingly, receive a request for an increase in the size of the charging current output to the battery. Here, "quick charge" may refer to particular battery charge implementations implemented by Qualcomm Inc. for fast charge of batteries.

In operation 930, the reception device may increase the output current of the charger, that is, the setting value of the charging current. In this case, the reception device may increase the setting value of the charging current immediately rather than gradually. Thereafter, in operation 940, the reception device may gradually increase the input current limit of the charger. For example, the reception device may increase the input current limit of the charger from 400 mA to 900 mA and increase the output current of the charger, that is, the setting value of the charging current from 400 mA to 800 mA. In this case, the reception device may immediately increase the output current of the charger, that is, the setting value of the charging current from 400 mA to 800 mA. Thereafter, the reception device may gradually increase the input current limit of the charger at intermediate values of 100 mA from 400 mA to 800 mA. Even though the setting value of the output current of the charger immediately increases, the size of the current input into the charger of the reception device is bound by the input current limit of the charger, so that the abrupt change in the output current or the charging current may be prevented.

Figure 10:
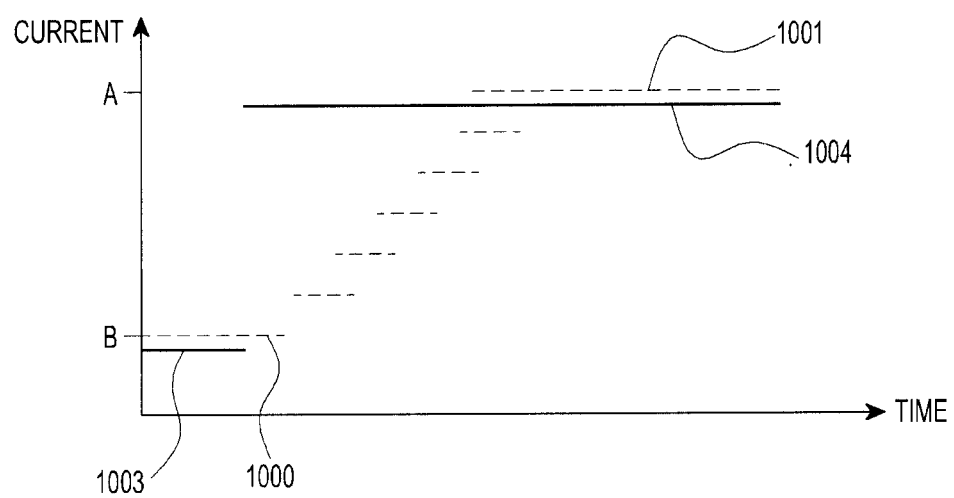
FIG. 10 is a graph illustrating an increase in the input current limit and an increase in the setting value of the charging current according to one embodiment of the present disclosure.

FIG. 10 is a graph illustrating an increase in the input current limit and an increase in the setting value of the charging current according to one embodiment. As illustrated in FIG. 10, the reception device according to one embodiment of the present disclosure may first increase the setting value of the output current of the charger from a first value 1003 to a second value 1004. Thereafter, the reception device may increase the input current limit step by step from a third value 1000 to a fourth value 1001.

Figure 11:
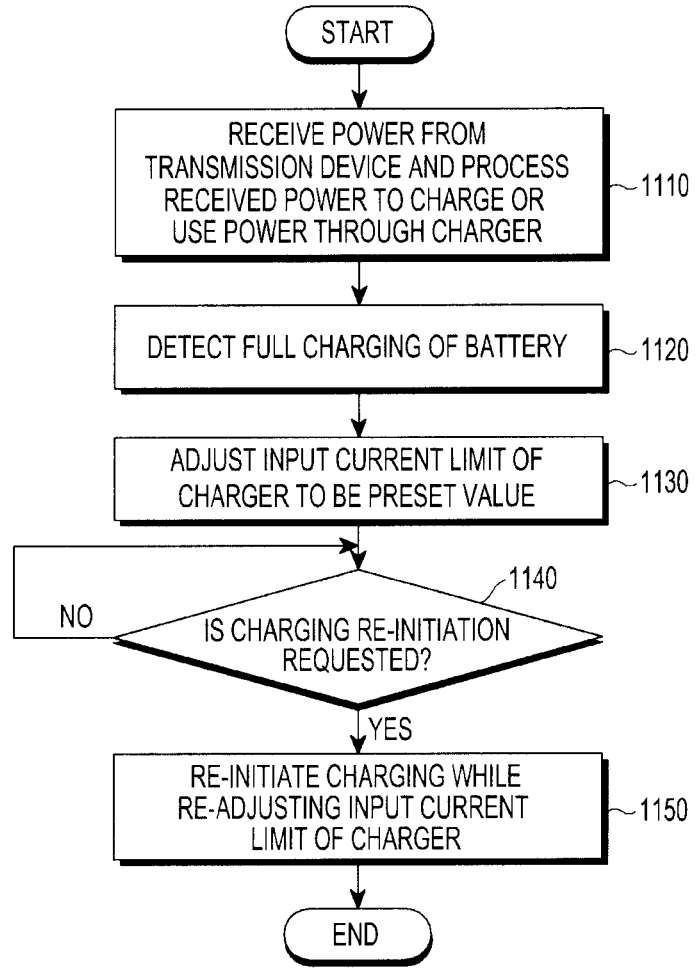
FIG. 11 is a flowchart illustrating a method of controlling the reception device according to one embodiment of the present disclosure.

FIG. 11 is a flowchart illustrating a method of controlling the reception device according to one embodiment of the present disclosure. An event for changing the input current limit of the charger in FIG. 11 may correspond to full charging of the battery.

In operation 1110, the reception device may receive power from the transmission device and process the received power to charge or use the power through the charger. In operation 1120, the reception device may detect a full charge of the battery. For example, the reception device may detect that the voltage, current, or residual power amount of the battery reaches a preset threshold value, and thus detect that the battery is fully charged.

Figure 12:
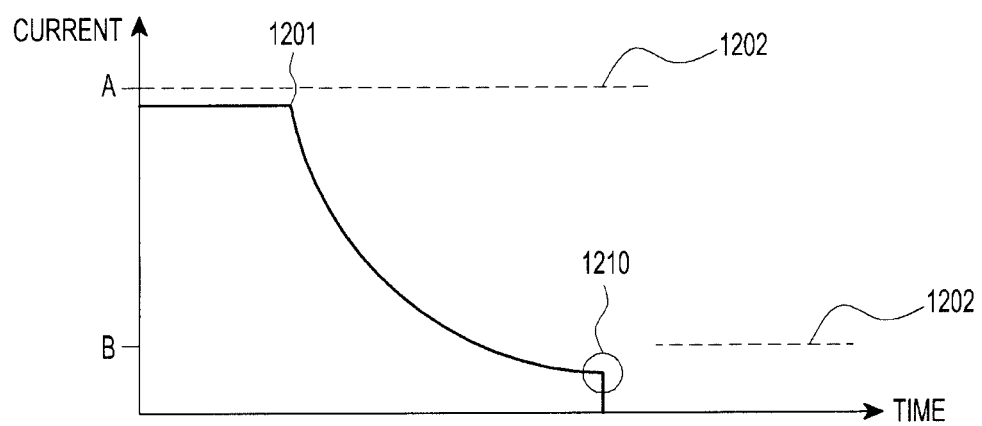
FIG. 12 is a graph illustrating a size of the charging current when a battery is fully charged according to one embodiment of the present disclosure.

In operation 1130, the reception device may adjust the input current limit of the charger to be a preset value. After fully charging the battery, the current from the charger to the battery, that is, a charging current 1201 may become 0 mA 1210 as illustrated in FIG. 12. When the reception device abruptly wakes up from an idle state, the input current output from the reception IC may abruptly and significantly increase and wireless charging may be disconnected due to the unstable output voltage of the reception IC. In order to prevent such a phenomenon, the reception device according to one embodiment of the present disclosure may adjust the input current limit of the charger to be a preset value after the battery is fully charged. For example, as illustrated in FIG. 12, the reception device may adjust the input current limit 1202 of the charger from a first value A to a second value B. Accordingly, even though the reception device abruptly wakes up from the idle state, a change in the output voltage of the reception IC may not be large, so that the wireless charging may not be disconnected. According to one embodiment of the present disclosure, the reception device may also gradually reduce the input current limit 1202.

In operation 1140, the reception device may determine whether re-initiation of charging is requested. For example, the reception device may detect that the residual power amount of the battery decreases to be smaller than a preset threshold value such that the re-initiation of charging is required. In operation 1150, the reception device may re-initiate the charging while re-adjusting the input current limit of the charger. According to one embodiment of the present disclosure, the reception device may gradually increase the input current limit of the charger.

Figure 13:
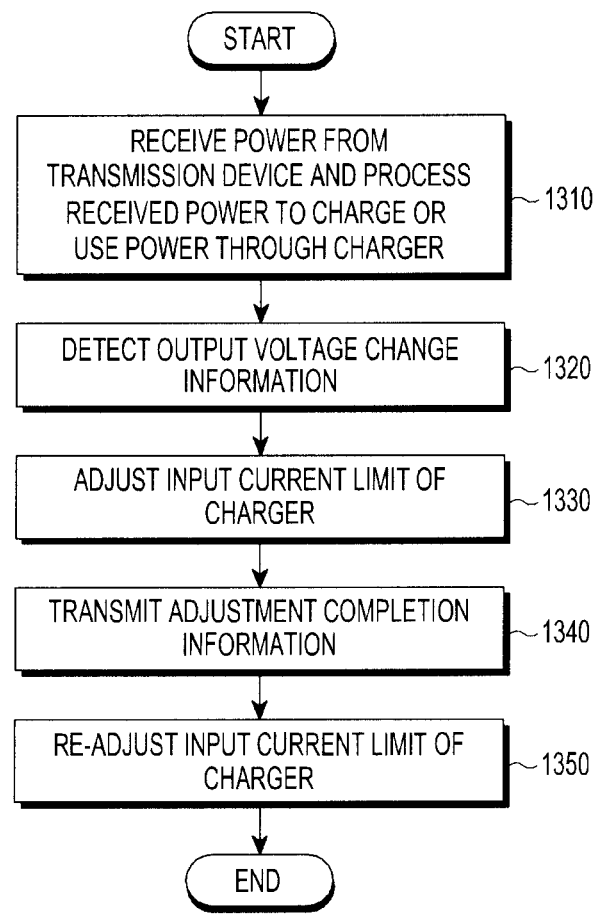
FIG. 13 is a flowchart illustrating a method of controlling the reception device according to one embodiment of the present disclosure.

FIG. 13 is a flowchart illustrating a method of controlling the reception device according to one embodiment of the present disclosure. An event for changing the input current limit of the charger in FIG. 13 may correspond to reception of information for changing at least one of the output voltage of the transmission device and the output voltage of the reception IC of the reception device.

In operation 1310, the reception device may receive power from the transmission device and process the received power to charge or use the power through the charger. In operation 1320, the reception device may receive output voltage change information. For example, the transmission device may transmit in advance the output voltage change information to the reception device before the output voltage is changed. The transmission device and the reception device may include a communication module for transmitting and receiving the output voltage change information to and from the reception device through out-band communication or in-band communication. Alternatively, the reception device may detect the output voltage change information by monitoring a voltage (Vrect) of a rectifier output end or a voltage (Vout) of a reception IC output end.

Figure 14:
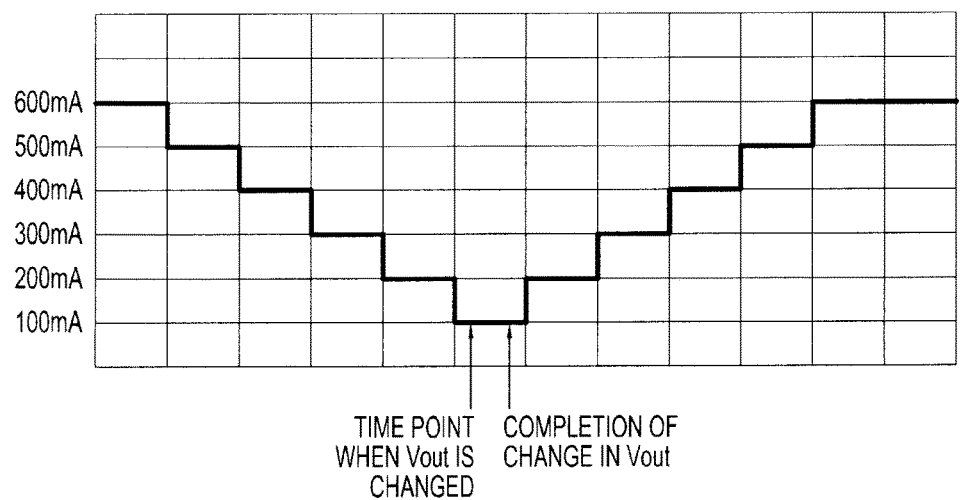
FIG. 14 is a graph illustrating a change in the input current limit of the charger when the output voltage is changed according to one embodiment of the present disclosure.

In operation 1330, the reception device may adjust the input current limit of the charger in accordance with the detection of the output voltage change information. For example, as illustrated in FIG. 14, the reception device may gradually reduce the input current limit of the charger up to a preset value. According to another embodiment, the reception device may immediately reduce the input current limit of the charger.

In operation 1340, the reception device may transmit adjustment completion information to the transmission device. The transmission device may change the output voltage in accordance with the reception of the adjustment completion information. Accordingly, as illustrated in FIG. 14, the output voltage of the transmission device or the output voltage of the reception IC may be changed when the input current limit of the charger of the reception device is a preset value. In FIG. 14, the preset value may be set as 100 mA, which may be larger than a minimum limit of the charger, which may be determined through a test.

In operation 1350, the reception device may re-adjust the input current limit of the charger. For example, as illustrated in FIG. 14, when output voltage change completion of the transmission device is transmitted, the input current limit of the reception device may be re-adjusted to the value before the adjustment. The reception device may increase the input current limit of the charger gradually or immediately. As described above, it is possible to prevent the wireless charging disconnection phenomenon due to the unstable voltage of the reception device according to the change in the output voltage of the transmission device.

Figure 15:
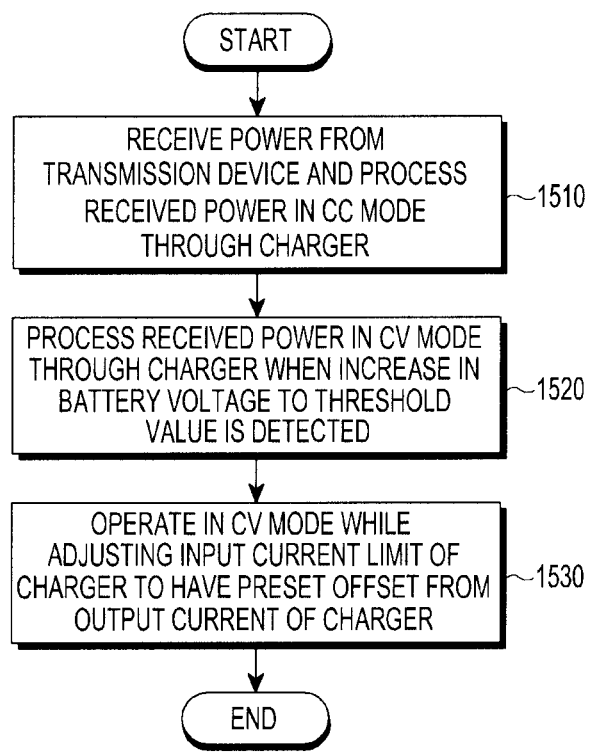
FIG. 15 is a flowchart illustrating a method of controlling the reception device according to one embodiment of the present disclosure.

FIG. 15 is a flowchart illustrating a method of controlling the reception device according to one embodiment of the present disclosure. An event for changing the input current limit of the charger in FIG. 15 may correspond to switching of a charging mode from a CC mode to a CV mode.

Figure 16A:
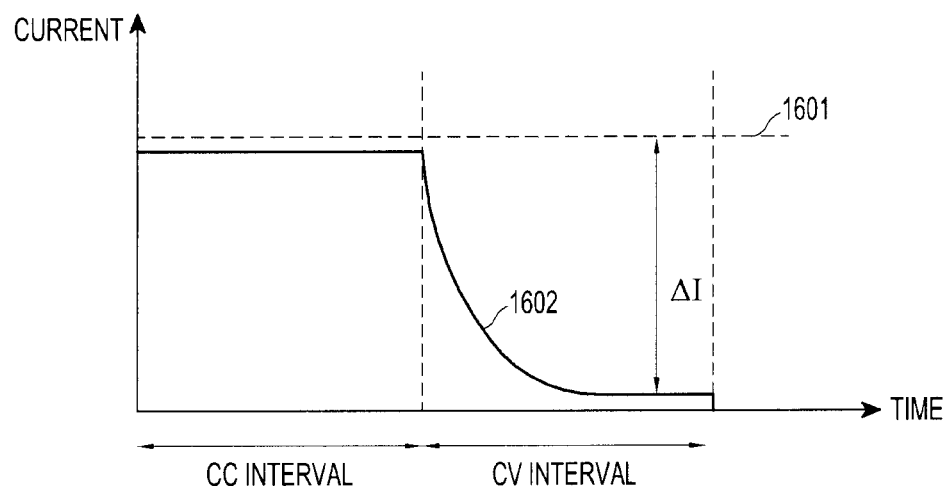
FIG. 16A is a graph illustrating a change of the charging current based on a change of the charging mode according to one embodiment of the present disclosure.

In operation 1510, the reception device may receive power from the transmission device and process the received power in a CC mode through the charger. For example, in initial charging of the battery, the charger of the reception device may charge the battery in the CC mode. During the charging in the CC mode, the size of the voltage of the battery may increase and the size of the current, that is, the charging current output from the charger and input into the battery, may be constant as illustrated in FIG. 16A.

In operation 1520, when the reception device detects that the battery voltage increases to be a threshold value, the reception device may process the received power in the CV mode through the charger. In the CV mode, the battery voltage may be constant and the size of the current may decrease as illustrated in FIG. 16A. If the input current limit 1601 of the charger is not adjusted, a difference (ΔI) between the input current limit of the charger and the charging current may increase in the CV mode and, accordingly, output current may become unstable.

Figure 16B:
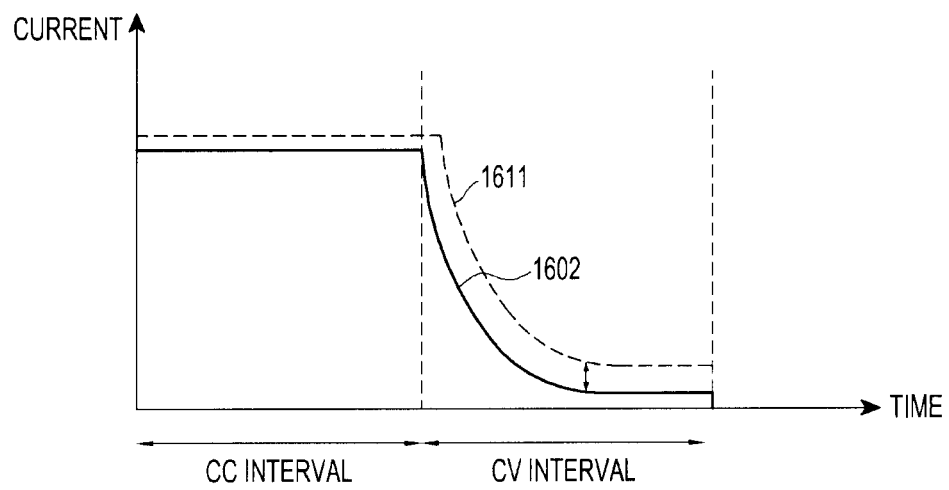
FIG. 16B is a graph illustrating a change in the input current limit of the charger based on the change in the charging mode according to one embodiment of the present disclosure.

In operation 1530, the reception device may operate in the CV mode while adjusting the input current limit of the charger to have a preset offset from the output current. For example, as illustrated in FIG. 16B, the reception device may reduce the input current limit 1611 of the charger to have the preset offset from the output voltage 1602 of the charger in the CV mode. A changeable range of the output current of the charger may be within the offset and, accordingly, stability of the output current may be improved.

Figure 17:
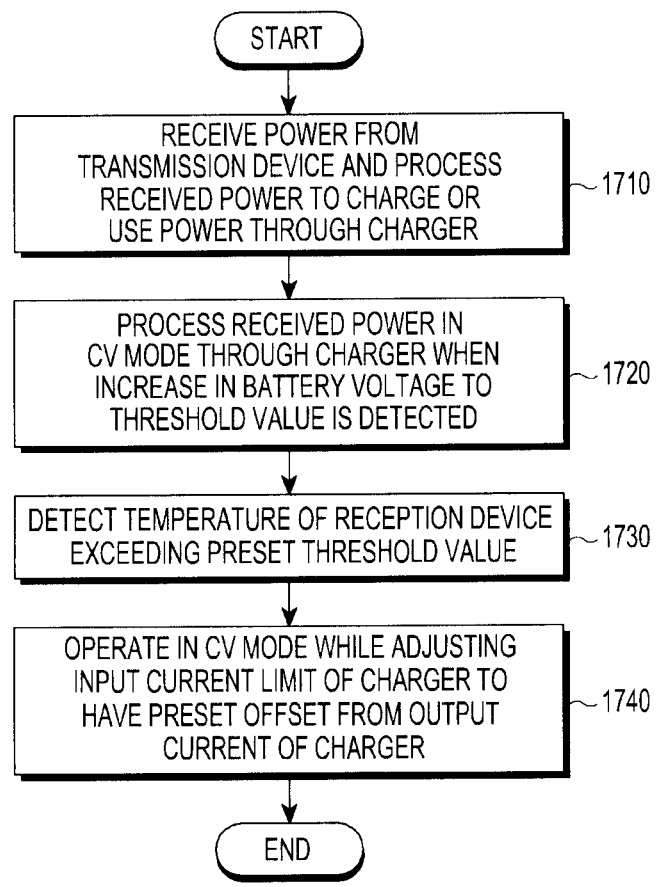
FIG. 17 is a flowchart illustrating a method of controlling the reception device according to one embodiment of the present disclosure.

FIG. 17 is a flowchart illustrating a method of controlling the reception device according to one embodiment of the present disclosure. An event for changing the input current limit of the charger in FIG. 17 may correspond to switching of the charging mode from a CC mode to the CV mode and detecting that a temperature exceeding a threshold value.

In operation 1710, the reception device may receive power from the transmission device and process the received power in the CC mode through the charger. For example, in initial charging of the battery, the charger of the reception device may charge the battery in the CC mode. In operation 1720, when the reception device detects that the battery voltage increases to be a threshold value, the reception device may process the received power in the CV mode through the charger.

In operation 1730, the reception device may additionally determine that a temperature of the reception device exceeds a preset threshold value. The reception device may further include a sensor for measuring a temperature of at least one hardware component included in the reception device, and the processor may measure the temperature of at least one hardware component of the reception device based on sensing data from a sensor. When it is determined that the temperature of the reception device exceeds the preset threshold value, the reception device may adjust the input current limit of the charger to have a preset offset from the output current of the charger in operation 1740.

When it is determined that the temperature exceeds the threshold value, the reception device according to one embodiment of the present disclosure may adjust the input current limit of the charger. In this case, an event for changing the input current limit of the charger may correspond to detecting a temperature exceeding a preset threshold value.

When it is determined that the temperature exceeds the threshold value, the reception device according to one embodiment of the present disclosure may increase the output voltage of the reception IC. For example, the reception device may increase the output voltage of the reception IC by increasing an output voltage of a DC/DC converter of the reception IC. In a high temperature environment, when the current is unstable, a relatively high negative ripple may occur in, for example, the CV mode. For example, the size of the negative ripple of the voltage (Vrect) of the output end of the rectifier of the reception IC may be larger than 2.2 V and, accordingly, the voltage (Vout) of the output end of the reception IC may decrease to be smaller than Under Voltage Drop Out (UVLO), so that the wireless charging disconnection phenomenon may be generated. The reception device according to one embodiment of the present disclosure may increase the voltage of the output end of the reception IC and, accordingly, the voltage of the output end of the reception IC may be prevented from being smaller than ULVO. The reception device according to one embodiment of the present disclosure may increase the voltage of the output end of the reception IC simultaneously while adjusting the input current limit of the charger. Alternatively, the reception device according to one embodiment of the present disclosure may only increase the voltage of the output end of the reception IC.

Figure 18:
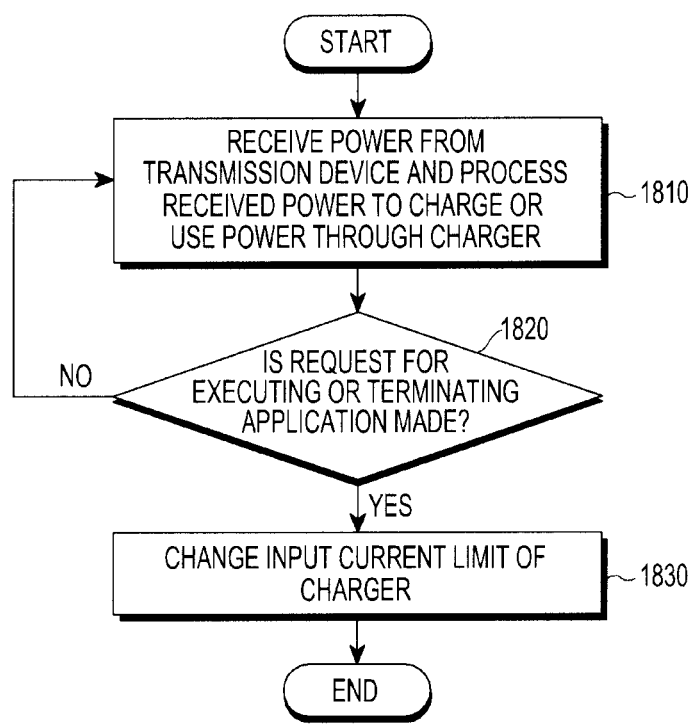
FIG. 18 is a flowchart illustrating a method of controlling the reception device according to one embodiment of the present disclosure.

FIG. 18 is a flowchart illustrating a method of controlling the reception device according to one embodiment of the present disclosure. According to the embodiment of FIG. 18, an event for changing the input current limit of the charger may correspond to receiving a request for executing or terminating an application.

In operation 1810, the reception device may receive power from the transmission device and process the received power to charge or use the power through the charger. In operation 1820, the reception device may determine whether the request for executing or terminating the application is received. When the application is executed or terminated, the reception device may change the input current limit of the charger in operation 1830. For example, when the application is executed, the application may require hardware components be powered, and thus the size of the current output to the system from the charger may abruptly increase. Alternatively, when the application is terminated, hardware corresponding to the application may be turned off and the size of the current output to the system from the charger may abruptly decrease. Accordingly, when a new application is executed or the application is terminated, the reception device may execute or terminate the application after gradually increasing or decreasing the input current limit of the charger before the corresponding application is executed or terminated. According to one embodiment of the present disclosure, the reception device may determine in advance an expected change in the size of the current output from the charger by the execution or the termination of the application and, only when the expected change is larger than a preset threshold value, adjust the input current limit of the charger.

For example, the reception device may store information on the size of the current consumed when the application starts. When an execution instruction of the application is detected, the reception device may adjust in advance the input current limit of the charger based on the size of the consumed current determined using the stored information. Meanwhile, the reception device may measure the size of the actually consumed current after the execution of the application and update the stored information based on the measured size of the consumed current. When a request for executing or terminating the application is made, the reception device may adjust in advance the input current limit of the charger based on the updated information.

Figure 19:
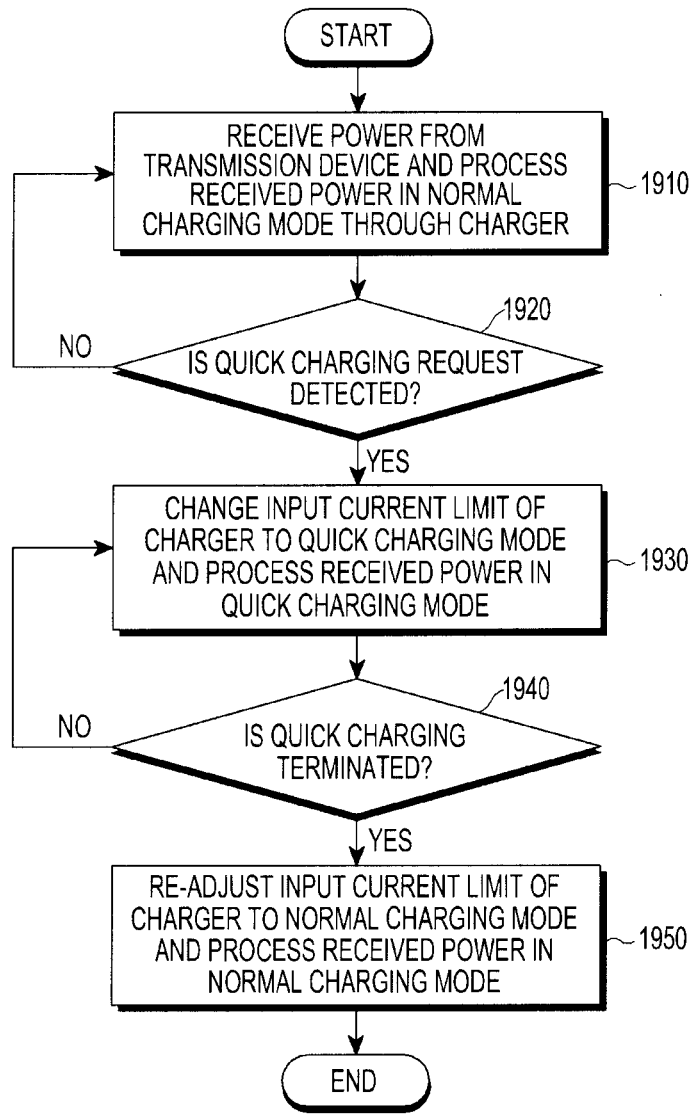
FIG. 19 is a flowchart illustrating a method of controlling the reception device according to one embodiment of the present disclosure.

FIG. 19 is a flowchart illustrating a method of controlling the reception device according to one embodiment of the present disclosure. According to the embodiment of FIG. 19, an event for changing the input current limit of the charger may correspond to a quick charging request.

In operation 1910, the reception device may receive power from the transmission device and may process the received power in a normal charging mode through the charger.

In operation 1920, the reception device may determine whether the quick charging request is detected. When the quick charging request is detected, the reception device may change the input current limit of the charger to a quick charging mode and process the received power in the quick charging mode in operation 1930. The reception device may increase the input current limit of the charger and, in this case, gradually increase the input current limit. In the quick charging mode, the reception device may wirelessly receive power having the larger size from the transmission device compared to the normal charging mode, and the size of the current output to the battery from the charger may also be larger compared to the normal charging mode. As the reception device gradually increases the input current limit of the charger, the abrupt change in the voltage or the current in the reception device may be prevented.

In operation 1940, the reception device may determine whether the quick charge is terminated. When the quick charging is terminated, the reception device may re-adjust the input current limit of the charger to the normal charging mode and process the received power in the normal charging mode in operation 1950. The reception device may decrease the input current limit of the charger, and the reception device according to one embodiment of the present disclosure may gradually decrease the input current limit of the charger. Accordingly, the abrupt change in the voltage or the current at one point of the reception device may be prevented.

Figure 20:
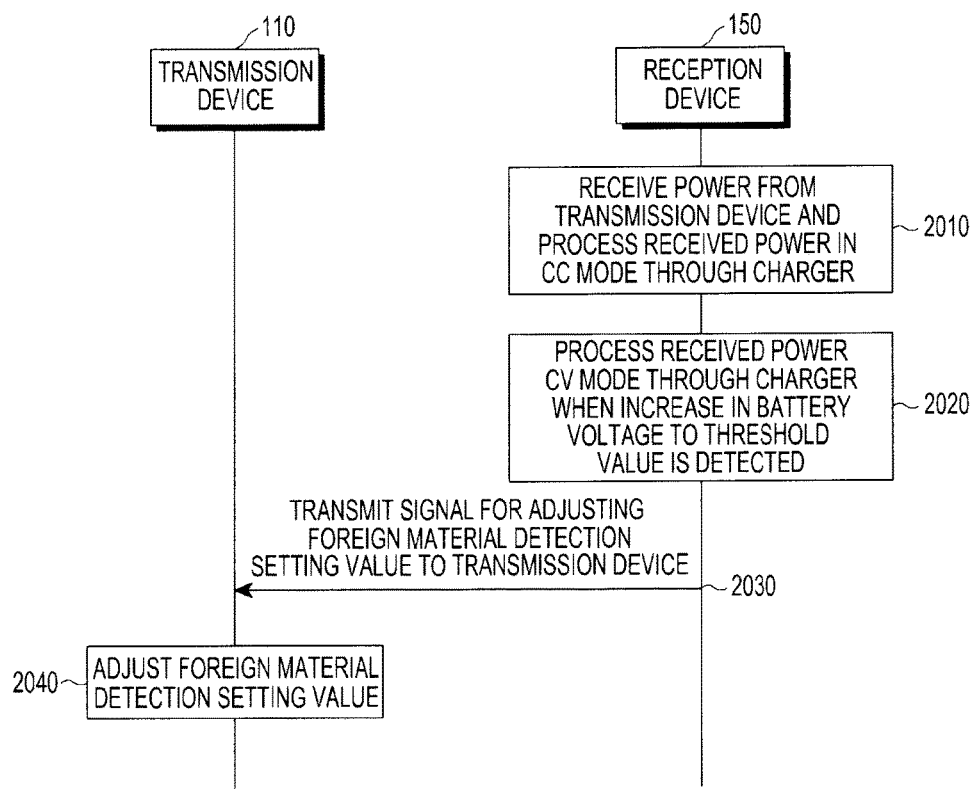
FIG. 20 illustrates operations of a transmission device and operations of a reception device according to one embodiment of the present disclosure.

FIG. 20 illustrates operations of a transmission device and operations of a reception device according to one embodiment of the present disclosure.

In operation 2010, the reception device may receive power from the transmission device and process the received power in the CC mode through the charger. In operation 2020, when the reception device detects that the battery voltage increases to be a threshold value, the reception device may process the received power in the CV mode through the charger.

In operation 2030, the reception device may transmit a signal for adjusting a foreign material detection setting value to the transmission device. In operation 2040, the transmission device may adjust the foreign material detection setting value. The transmission device more sensitively detects the foreign material in the CV mode. Accordingly, the transmission device may identify false-positive foreign material in the CV mode, which may lead to the transmission device erroneously stopping the charging. When entering the CV mode, the reception device according to one embodiment of the present disclosure may transmit information indicating the entrance to the CV mode or a signal for adjusting the foreign material detection setting value to the transmission device. The transmission device may adjust the foreign material detection setting value to be less sensitive and, accordingly, the wireless charging disconnection phenomenon may be prevented in the CV mode. For example, when the reception device complies with the standard of A4WP, the transmission device may detect foreign material by sensing a load change of a resonator while a beacon is applied to the resonator. When the size of the load change exceeds a threshold value, the transmission device may determine that foreign material is detected. When the transmission device receives the signal for adjusting the foreign material detection setting value, the transmission device may increase the threshold value for the comparison, so as to adjust the foreign material detection to be less sensitive.

Figure 21:
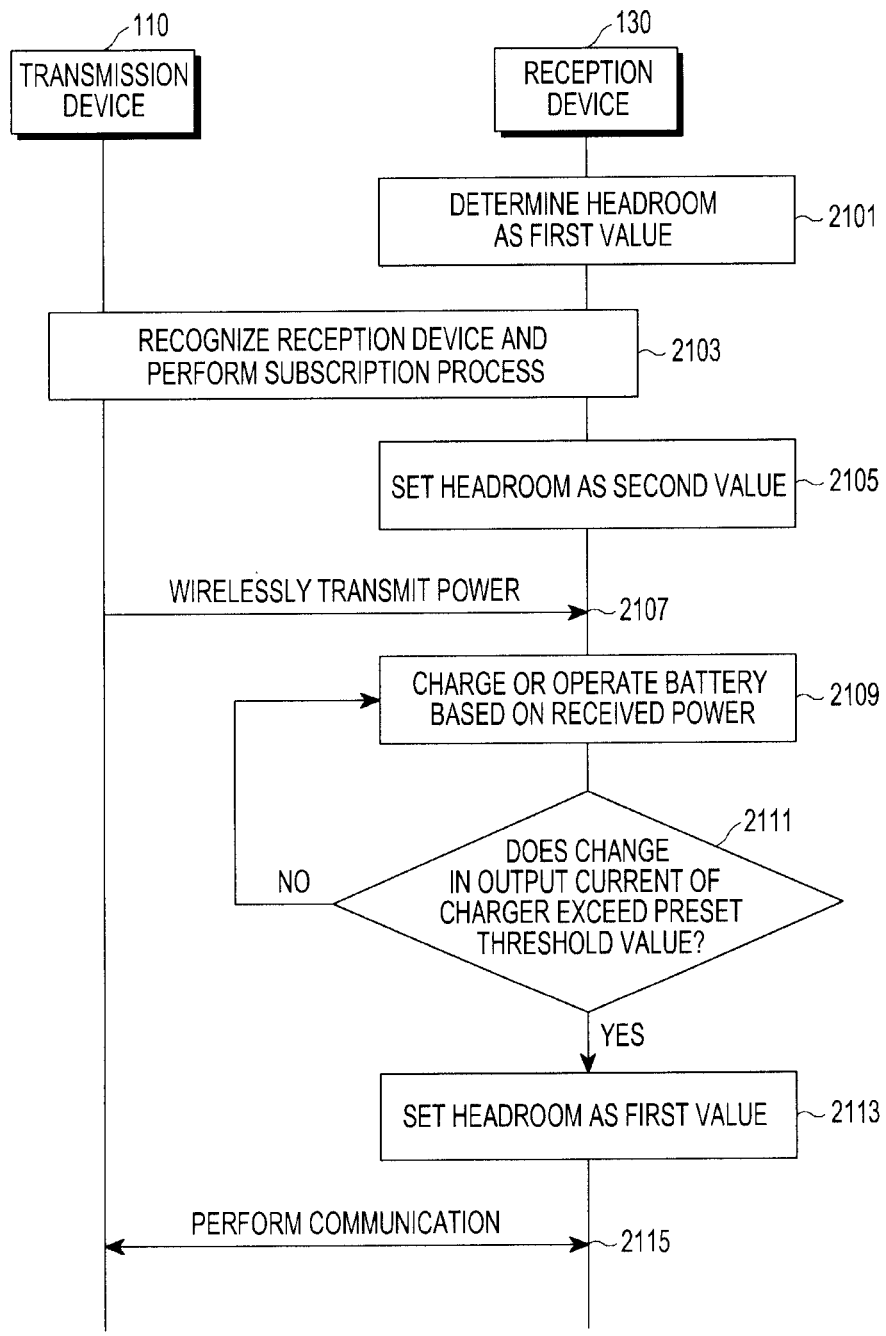
FIG. 21 illustrates operations of a transmission device and operations of a reception device according to one embodiment of the present disclosure.

FIG. 21 illustrates operations of a transmission device and operations of a reception device according to one embodiment of the present disclosure.

In operation 2101, the reception device may set a headroom between a voltage (Vrect) of power rectified by a rectifier of the reception IC and a voltage (Vout) of power output from the reception IC as a first value. Here, the first value may be larger than a second value described below. A relatively larger headroom value allows for smaller voltage drops and smaller current changes within the reception device. Therefore, a relatively larger headroom value allows for more stable wireless charging and reduces unwanted disconnects. However, as the headroom has the relatively large value, wireless charging efficiency may deteriorate. Before charging is initiated, the reception device may set the headroom as the first value corresponding to the relatively large value, so that stable wireless charging may be initiated.

In operation 2103, the reception device and the transmission device may perform a reception device recognition process and a reception device subscription process. When the recognition is completed, the reception device may set the headroom as the second value in operation 2105. The second value is relatively smaller than the first value, and the reception device has a relatively low headroom value, thereby relatively increasing wireless charging efficiency.

In operation 2107, the transmission device may wirelessly transmit power. In operation 2109, the reception device may charge the battery or operate the system of the reception device based on the received power. In operation 2111, the reception device may determine whether a change in the output current of the charger exceeds a preset threshold value. For example, the reception device may detect that the current change exceeds the preset threshold value when the output current of the charger decreases in the CV mode. When it is determined that the change in the output current of the charger exceeds the preset threshold value, the reception device may set the headroom as the first value in operation 2113. As described above, the reception device may have a headroom of a relatively large value to perform stable wireless charging. Particularly, when the reception device performs in-band type communication, the communication may fail in the CV mode, and the reception device according to one embodiment of the present disclosure may have a headroom of a relatively large value to prevent the communication failure. In operation 2115, the reception device and the transmission device may communicate with each other.

According to one embodiment of the present disclosure, a method of controlling a reception device for receiving wireless power may include an operation of wirelessly receiving power from a transmission device, and rectifying and outputting the received power; processing the rectified power to charge a battery of the reception device or outputting the rectified power to a system of the reception device; and when an event for changing an input current limit of a charger is detected, gradually changing the input current limit of the charger by stepping up or stepping down the input current limit to one or more intermediary values until the input current limit reaches a predetermined value.

According to one embodiment of the present disclosure, the input current limit of the charger is gradually changed when a requested amount of a change in the input current limit of the charger is larger than a preset threshold value.

According to one embodiment of the present disclosure, when the event for changing the input current limit of the charger corresponds to a request for decreasing an output current of the charger, the method further includes: gradually decreasing the input current limit of the charger by stepping down the input current limit to the one or more intermediary values until the input current limit reaches the predetermined value; and decreasing a setting value of the output current of the charger after the decreasing of the input current limit of the charger is finished.

According to one embodiment of the present disclosure, when the event for changing the input current limit of the charger corresponds to a request for increasing an output current of the charger, the method further includes: increasing a setting value of the output current of the charger; and after the setting value of the output current of the charger is increased, gradually increasing the input current limit of the charger by stepping up the input current limit to the one or more intermediary values until the input current limit reaches the predetermined value.

According to one embodiment of the present disclosure, when the event for changing the input current limit of the charger corresponds to a detection of a full charge of the battery, the method further includes decreasing the input current limit of the charger to a preset value.

According to one embodiment of the present disclosure, when re-initiation of charging of the battery is requested, the method further includes increasing the input current limit of the charger.

According to one embodiment of the present disclosure, the input current limit of the charger is gradually decreased when the event for changing the input current limit of the charger corresponds to detection of output voltage change information from the transmission device.

According to one embodiment of the present disclosure, the method may further include: after the output voltage change by the transmission device is complete, gradually re-adjusting the input current limit of the charger by stepping up the input current limit to another one or more intermediary values until the input current limit reaches another predetermined value.

According to one embodiment of the present disclosure, when the event for changing the input current limit of the charger corresponds to switching of a charging mode of the battery from a Constant Current (CC) mode to a Constant Voltage (CV) mode, the method further includes adjusting the input current limit of the charger to have a preset offset from the output current of the charger.

According to one embodiment of the present disclosure, when the event for changing the input current limit of the charger corresponds to switching of a charging mode of the battery from a Constant Current (CC) mode to a Constant Voltage (CV) mode, and when a temperature in at least one part of the reception device exceeds a threshold value, the method further includes adjusting the input current limit of the charger to have a preset offset from the output current of the charger.

According to one embodiment of the present disclosure, when the event for changing the input current limit of the charger corresponds to a request for executing an application of the reception device or a request for terminating the application, the method further includes: gradually increasing the input current limit of the charger by stepping up the input current limit to the one or more intermediary values until the input current limit reaches the predetermined value when the request for executing the application is detected; and gradually decreasing the input current limit of the charger by stepping down the input current limit to another one or more intermediary values until the input current limit reaches another predetermined value when the request for terminating the application is detected.

According to one embodiment of the present disclosure, the input current limit of the charger is gradually changed when a size of an expected current change according to the execution or the termination of the application exceeds a preset threshold.

According to one embodiment of the present disclosure, when the event for changing the input current limit of the charger corresponds to a request for a quick charge operation of the battery, the method further includes gradually increasing the input current limit of the charger by stepping up the input current limit to the one or more intermediary values until the input current limit reaches the predetermined value.

According to one embodiment of the present disclosure, when a request for terminating the quick charge operation is detected, the method further includes gradually decreasing the input current limit of the charger by stepping down the input current limit to another one or more intermediary values until the input current limit reaches another predetermined value in accordance with a normal charging mode.

Each of the components of the electronic device according to the present disclosure may be implemented by one or more components and the name of the corresponding component may vary depending on a type of the electronic device. In various embodiments, the inspection apparatus may include at least one of the above-described elements. Some of the above-described elements may be omitted from the electronic device, or the inspection apparatus may further include additional elements. Further, some of the components of the electronic device according to the various embodiments of the present disclosure may be combined to form a single entity, and thus, may equivalently execute functions of the corresponding elements prior to the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the command is executed by one or more processors, the one or more processors may perform a function corresponding to the command.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

According to various embodiments of the present disclosure, a storage medium having instructions stored therein is provided. The instructions may be configured to cause, when being executed by at least one processor, the at least one processor to perform at least one operation. The at least one operation may include an operation of wirelessly receiving power from a transmission device, and rectifying and outputting the received power, an operation of processing the rectified power and charging the power in a battery of the reception device or outputting the power to a system of the reception device, and an operation of, when an event for changing an input current limit of a charger is detected, changing the input current limit of the charger step by step.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

What is claimed is:

1. A reception device for receiving wireless power, the reception device comprising:
    a power reception circuit configured to wirelessly receive power from a transmission device, rectify the received power, and output the rectified power;
    a charger configured to process the rectified power received from the power reception circuit and charge a battery of the reception device or output the rectified power to a system of the reception device; and
    a control circuit configured to, when an event for changing an input current limit of the charger is detected, gradually change the input current limit of the charger by stepping up or stepping down the input current limit to one or more intermediary values until the input current limit reaches a predetermined value,
    wherein when the event for changing the input current limit of the charger corresponds to a change of an input current of the charger over a first time period that causes a disconnection between the reception device and the transmission device, the input current of the charger is gradually changed over a second time period longer than the first time period, such that connection between the reception device and the transmission device is maintained.

2. The reception device of claim 1, wherein, when a requested amount of a change in the input current limit of the charger is larger than a preset threshold value, the control circuit is configured to gradually change the input current limit of the charger by stepping up or stepping down the input current limit to the one or more intermediary values until the input current limit reaches the predetermined value.

3. The reception device of claim 1, wherein when the event for changing the input current limit of the charger corresponds to a request for decreasing an output current of the charger, the control circuit is configured to:
    gradually decrease the input current limit of the charger by stepping down the input current limit to the one or more intermediary values until the input current limit reaches the predetermined value, and
    decrease a setting value of the output current of the charger after the decreasing of the input current limit of the charger is finished.

4. The reception device of claim 1, wherein when the event for changing the input current limit of the charger corresponds to a request for increasing an output current of the charger, the control circuit is configured to:
    increase a setting value of the output current of the charger, and
    after the setting value of the output current of the charger is increased, gradually increase the input current limit of the charger by stepping up the input current limit to the one or more intermediary values until the input current limit reaches the predetermined value.

5. The reception device of claim 1, wherein when the event for changing the input current limit of the charger corresponds to a detection of a full charge of the battery, the control circuit is configured to decrease the input current limit of the charger to a preset value.

6. The reception device of claim 5, wherein when re-initiation of charging of the battery is requested, the control circuit is configured to increase the input current limit of the charger.

7. The reception device of claim 1, wherein when the event for changing the input current limit of the charger corresponds to detection of output voltage change information from the transmission device, the control circuit is configured to gradually change the input current limit of the charger by stepping down the input current limit to the one or more intermediary values until the input current limit reaches the predetermined value.

8. The reception device of claim 7, wherein after output voltage change by the transmission device is complete, the control circuit is configured to gradually re-adjust the input current limit of the charger by stepping up the input current limit to another one or more intermediary values until the input current limit reaches another predetermined value.

9. The reception device of claim 1, wherein when the event for changing the input current limit of the charger corresponds to switching of a charging mode of the battery from a Constant Current (CC) mode to a Constant Voltage (CV) mode, the control circuit is configured to adjust the input current limit of the charger to have a preset offset from the output current of the charger.

10. The reception device of claim 1, wherein when the event for changing the input current limit of the charger corresponds to switching of a charging mode of the battery from a Constant Current (CC) mode to a Constant Voltage (CV) mode, and when a temperature in at least one part of the reception device exceeds a threshold value, the control circuit is configured to adjust the input current limit of the charger to have a preset offset from the output current of the charger.

11. The reception device of claim 1, wherein when the event for changing the input current limit of the charger corresponds to a request for executing an application of the reception device or a request for terminating the application, the control circuit is configured to:
  gradually increase the input current limit of the charger by stepping up the input current limit to the one or more intermediary values until the input current limit reaches the predetermined value when the request for executing the application is detected; and
  gradually decrease the input current limit of the charger by stepping down the input current limit to another one or more intermediary values until the input current limit reaches another predetermined value when the request for terminating the application is detected.

12. The reception device of claim 11, wherein when a size of an expected current change according to the execution or the termination of the application exceeds a preset threshold, the control circuit is configured to gradually change the input current limit of the charger.

13. The reception device of claim 1, wherein when the event for changing the input current limit of the charger corresponds to a request for a quick charge operation of the battery, the control circuit is configured to gradually increase the input current limit of the charger by stepping up the input current limit to the one or more intermediary values until the input current limit reaches the predetermined value.

14. The reception device of claim 13, wherein when a request for terminating the quick charge operation is detected, the control circuit is configured to gradually decrease the input current limit of the charger by stepping down the input current limit to another one or more intermediary values until the input current limit reaches another predetermined value in accordance with a normal charging mode.

15. A method of controlling a reception device for receiving wireless power, the method comprising:
  wirelessly receiving power from a transmission device, and rectifying and outputting the received power;
  processing the rectified power to charge a battery of the reception device or outputting the rectified power to a system of the reception device; and
  when an event for changing an input current limit of a charger is detected, gradually changing the input current limit of the charger by stepping up or stepping down the input current limit to one or more intermediary values until the input current limit reaches a predetermined value,
  wherein when the event for changing the input current limit of the charger corresponds to a change of an input current of the charger over a first time period that causes a disconnection between the reception device and the transmission device, the input current of the charger is gradually changed over a second time period longer than the first time period, such that connection between the reception device and the transmission device is maintained.

16. The method of claim 15, wherein the input current limit of the charger is gradually changed when a requested amount of a change in the input current limit of the charger is larger than a preset threshold value.

17. The method of claim 15, wherein when the event for changing the input current limit of the charger corresponds to a request for decreasing an output current of the charger, the method further comprises:
  gradually decreasing the input current limit of the charger by stepping down the input current limit to the one or more intermediary values until the input current limit reaches the predetermined value; and
  decreasing a setting value of the output current of the charger after the decreasing of the input current limit of the charger is finished.

18. The method of claim 15, wherein when the event for changing the input current limit of the charger corresponds to a request for increasing an output current of the charger, the method further comprises:
  increasing a setting value of the output current of the charger; and
  after the setting value of the output current of the charger is increased, gradually increasing the input current limit of the charger by stepping up the input current limit to the one or more intermediary values until the input current limit reaches the predetermined value.

19. The method of claim 15, wherein when the event for changing the input current limit of the charger corresponds to a detection of a full charge of the battery, the method further comprises decreasing the input current limit of the charger to a preset value.

20. The method of claim 19, wherein when re-initiation of charging of the battery is requested, the method further comprises increasing the input current limit of the charger.

21. The method of claim 15, wherein the input current limit of the charger is gradually decreased when the event for changing the input current limit of the charger corresponds to detection of output voltage change information from the transmission device.

22. The method of claim 21, further comprising:
  after the output voltage change by the transmission device is complete, gradually re-adjusting the input current limit of the charger by stepping up the input current limit to another one or more intermediary values until the input current limit reaches another predetermined value.

23. The method of claim 15, wherein when the event for changing the input current limit of the charger corresponds to switching of a charging mode of the battery from a Constant Current (CC) mode to a Constant Voltage (CV) mode, the method further comprises adjusting the input current limit of the charger to have a preset offset from the output current of the charger.

24. The method of claim 15, wherein when the event for changing the input current limit of the charger corresponds to switching of a charging mode of the battery from a Constant Current (CC) mode to a Constant Voltage (CV) mode, and when a temperature in at least one part of the reception device exceeds a threshold value, the method further comprises adjusting the input current limit of the charger to have a preset offset from the output current of the charger.

25. The method of claim 15, wherein when the event for changing the input current limit of the charger corresponds to a request for executing an application of the reception device or a request for terminating the application, the method further comprises:
  gradually increasing the input current limit of the charger by stepping up the input current limit to the one or more intermediary values until the input current limit reaches the predetermined value when the request for executing the application is detected; and
  gradually decreasing the input current limit of the charger by stepping down the input current limit to another one or more intermediary values until the input current limit reaches another predetermined value when the request for terminating the application is detected.

26. The method of claim 25, wherein the input current limit of the charger is gradually changed when a size of an expected current change according to the execution or the termination of the application exceeds a preset threshold.

27. The method of claim 15, wherein when the event for changing the input current limit of the charger corresponds to a request for a quick charge operation of the battery, the method further comprises gradually increasing the input current limit of the charger by stepping up the input current limit to the one or more intermediary values until the input current limit reaches the predetermined value.

28. The method of claim 27, wherein when a request for terminating the quick charge operation is detected, the method further comprises gradually decreasing the input current limit of the charger by stepping down the input current limit to another one or more intermediary values until the input current limit reaches another predetermined value in accordance with a normal charging mode.

29. A reception device for receiving wireless power, the reception device comprising:
- a power reception circuit configured to wirelessly receive power from a transmission device, and rectify and output the received power;
- a charger configured to process the rectified power received from the power reception circuit and charge a battery of the reception device or output the power to a system of the reception device;
- a temperature sensor; and
- a control circuit configured to, when a temperature sensed by the temperature sensor exceeds a preset threshold value, control to increase an output voltage of the power reception circuit to a preset value.

30. A reception device for receiving wireless power, the reception device comprising:
- a power reception circuit configured to wirelessly receive power from a transmission device and comprising a rectifier to rectify the received power;
- a charger configured to process the rectified power received from the power reception circuit and charge a battery of the reception device or output the power to a system of the reception device; and
- a control circuit configured to set a headroom value between an output voltage of the rectifier and an output voltage of the power reception circuit as a first value for a first period during which the reception device is recognized by the transmission device and set the headroom value as a second value for a second period during which the reception device wirelessly receives the power from the transmission device.

31. The reception device of claim 30, wherein when switching of a charging mode of the charger from a Constant Current (CC) mode to a Constant Voltage (CV) mode is detected, the control circuit is configured to change the headroom from the second value to the first value.

32. A reception device for receiving wireless power, the reception device comprising:
- a power reception circuit configured to wirelessly receive power from a transmission device and comprising a rectifier to rectify the received power;
- a communication module;
- a charger configured to process the rectified power received from the power reception circuit and charge a battery of the reception device or output the power to a system of the reception device; and
- a control circuit configured to, when switching of a charging mode of the charger from a Constant Current (CC) mode to a Constant Voltage (CV) mode is detected, control the communication module to transmit a request for resetting a foreign material detection setting value to the transmission device.

* * * * *